United States Patent
Yokoyama

(10) Patent No.: US 9,014,709 B2
(45) Date of Patent: Apr. 21, 2015

(54) WIRELESS COMMUNICATION SYSTEM, MANAGEMENT DEVICE, AND MOBILE TERMINAL UNIT

(71) Applicant: Fujitsu Limited, Kawasaki-shi, Kanagawa (JP)

(72) Inventor: Hitoshi Yokoyama, Shinagawa (JP)

(73) Assignee: Fujitsu Limited, Kawasaki (JP)

( * ) Notice: Subject to any disclaimer, the term of this patent is extended or adjusted under 35 U.S.C. 154(b) by 347 days.

(21) Appl. No.: 13/669,574

(22) Filed: Nov. 6, 2012

(65) Prior Publication Data
US 2013/0065626 A1    Mar. 14, 2013

Related U.S. Application Data

(63) Continuation of application No. PCT/JP2010/057827, filed on May 7, 2010.

(51) Int. Cl.
H04W 72/00    (2009.01)
H04W 74/08    (2009.01)

(52) U.S. Cl.
CPC ...... *H04W 74/0875* (2013.01); *H04W 74/0866* (2013.01)

(58) Field of Classification Search
USPC ........... 455/422.1, 450–453, 456.2, 464, 509, 455/510, 435.2, 512–517, 166.2, 412.1, 455/412.2; 370/395.41, 332; 375/E7.141
See application file for complete search history.

(56) References Cited

U.S. PATENT DOCUMENTS

| | | | |
|---|---|---|---|
| 5,008,883 A * | 4/1991 | Eizenhofer et al. | 370/348 |
| 6,031,832 A | 2/2000 | Turina | |
| 6,611,514 B1 | 8/2003 | Moulsley | |
| 6,621,803 B2 | 9/2003 | Halton et al. | |
| 6,842,618 B2 | 1/2005 | Zhang | |
| 6,885,866 B1 | 4/2005 | Wikstedt et al. | |
| 7,003,302 B2 * | 2/2006 | Yoshida et al. | 455/450 |
| 7,760,680 B2 * | 7/2010 | Chen et al. | 370/328 |

(Continued)

FOREIGN PATENT DOCUMENTS

| | | |
|---|---|---|
| EP | 2 134 136 | 12/2009 |
| EP | 2 178 321 | 4/2010 |

(Continued)

OTHER PUBLICATIONS

Notice of Rejection dated Dec. 17, 2013, from corresponding Japanese Application No. 2012-513757.

(Continued)

*Primary Examiner* — Dominic E Rego
(74) *Attorney, Agent, or Firm* — Katten Muchin Rosenman LLP

(57) ABSTRACT

A management device includes a managing unit that manages whether a dedicated access slot different from an access slot is assigned to the mobile terminal unit, the access slot being arbitrarily used by a mobile terminal unit when the mobile terminal unit gets random access to a base station unit, a selecting unit that selects a dedicated access slot which has not been assigned among dedicated access slots managed by the managing unit when having received a priority notification indicating that a mobile terminal unit being a communicating destination of the base station unit is a priority terminal given priority for performing communication, and an instructing unit that instructs the base station unit managed by the management device to reserve the dedicated access slot selected by the selecting unit.

10 Claims, 18 Drawing Sheets

(56) References Cited

U.S. PATENT DOCUMENTS

| | | | |
|---|---|---|---|
| 7,995,536 B2 | 8/2011 | Ogawa et al. | |
| 8,259,752 B2 * | 9/2012 | Terry et al. | 370/469 |
| 8,873,475 B2 * | 10/2014 | Ono | 370/329 |
| 2008/0081651 A1 * | 4/2008 | Kuroda et al. | 455/509 |
| 2009/0303965 A1 * | 12/2009 | Yokoyama | 370/331 |
| 2010/0130224 A1 * | 5/2010 | Ishizu et al. | 455/453 |

FOREIGN PATENT DOCUMENTS

| | | |
|---|---|---|
| JP | 8-154097 | 6/1996 |
| JP | 2000-151494 | 5/2000 |
| JP | 2002-519970 | 7/2002 |
| JP | 2002-535900 | 10/2002 |
| JP | 2007-82259 | 3/2007 |
| JP | 2007-300384 | 11/2007 |
| JP | 2007-306628 | 11/2007 |
| JP | 2009-112023 | 5/2009 |
| JP | 2009-296505 | 12/2009 |
| WO | 2009/020213 | 2/2009 |

OTHER PUBLICATIONS

International Search Report dated Aug. 10, 2010, from corresponding International Application No. PCT/JP2010/057827.

* cited by examiner

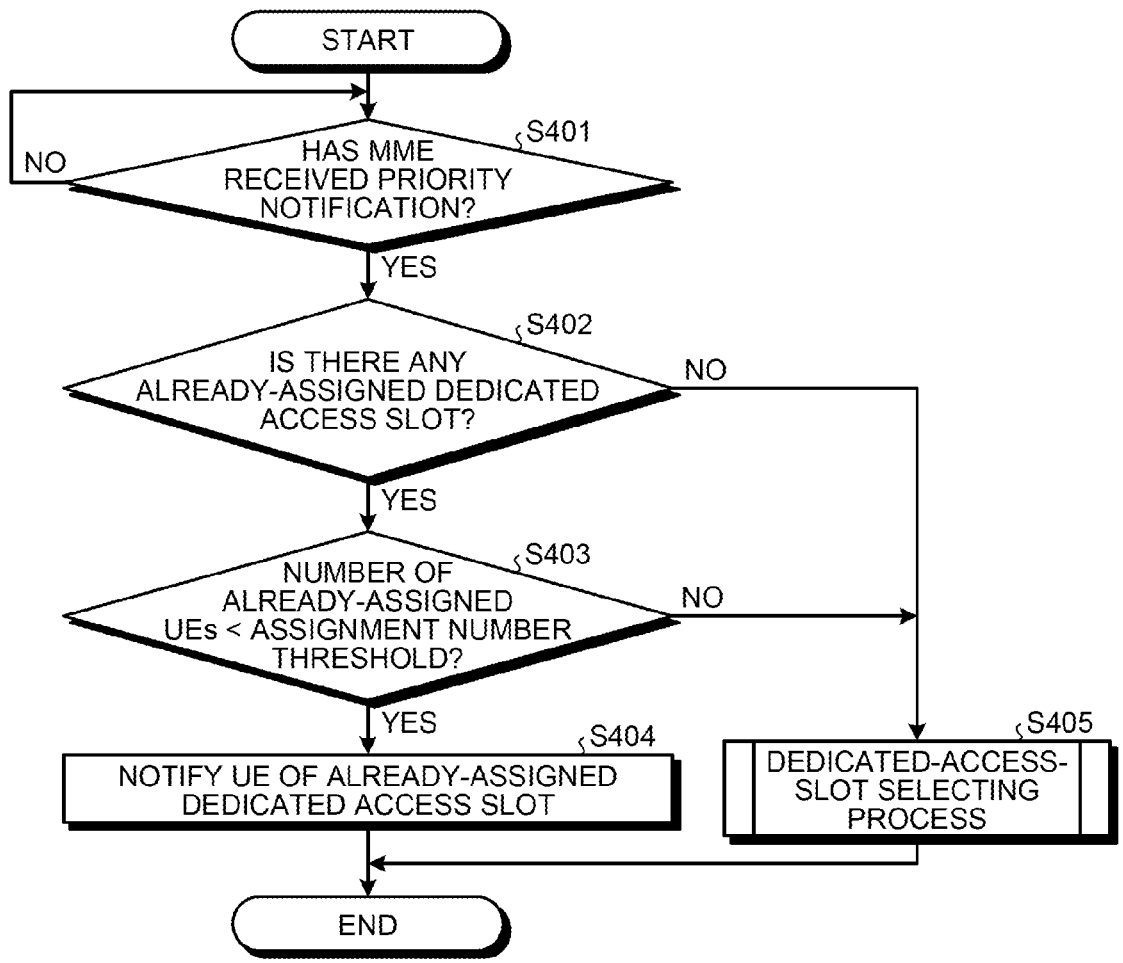

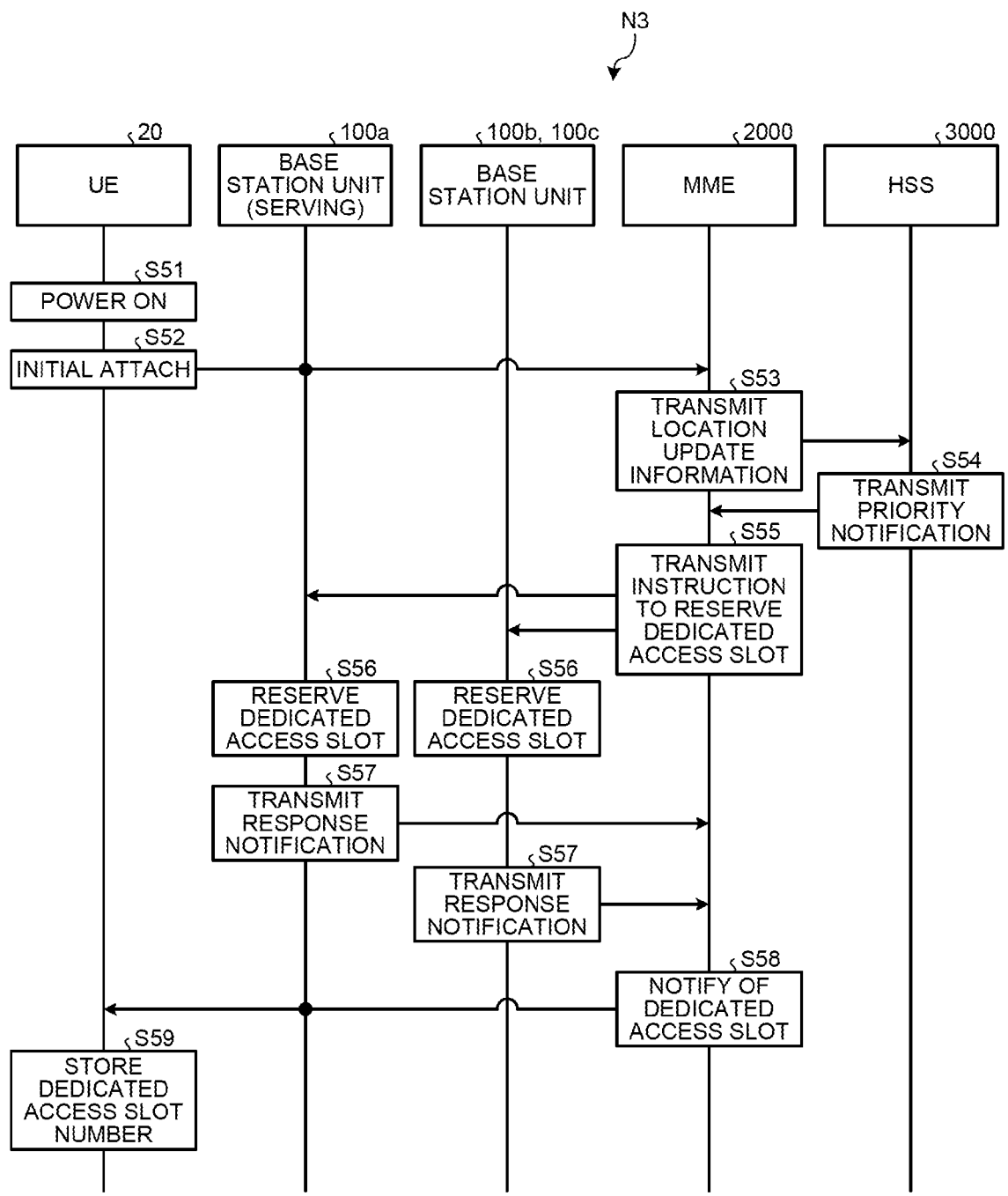

WIRELESS COMMUNICATION SYSTEM, MANAGEMENT DEVICE, AND MOBILE TERMINAL UNIT

CROSS-REFERENCE TO RELATED APPLICATION

This application is a continuation application of International Application PCT/JP2010/057827, filed on May 7, 2010, and designating the U.S., the entire contents of which are incorporated herein by reference.

FIELD

The embodiments discussed herein are related to a wireless communication system, a management device, and a mobile terminal unit.

BACKGROUND

In general, in a wireless communication system, when a mobile terminal unit such as a cellular phone initiates communication with a base station unit, the mobile terminal unit may get access to the base station unit by using an access method called random access. In the random access, a mobile terminal unit transmits a communication establishment request including an identifier called preamble and the like to a base station unit through an RACH (Random Access CHannel), thereby establishing communication between the mobile terminal unit and the base station unit.

Specifically, in the random access, a mobile terminal unit transmits a communication establishment request to a base station unit through an arbitrary access slot out of multiple random-sequence access slots. Therefore, if multiple mobile terminal units transmit a communication establishment request through the same access slot at the same timing, there may be a random access contention between the mobile terminal units. In the event of occurrence of a random access contention, after waiting for a predetermined time, the mobile terminal unit again transmits the communication establishment request to the base station unit through an arbitrary access slot, thereby retrying to establish communication with the base station unit. Consequently, when a random access contention occurs, establishment of communication between the mobile terminal unit and the base station unit is delayed.

In recent years, to prevent such a delay in establishment of communication, there has been proposed a technology to constantly assign a fixed access slot to a particular mobile terminal unit. Specifically, a mobile terminal unit given priority for performing communication is assigned an access slot that the other mobile terminal units do not use. According to such a technology, random access by the particular mobile terminal unit is not in contention with random access by the other mobile terminal units, so there is no delay in the establishment of communication between the particular mobile terminal unit and the base station unit.

Patent Literature 1: Japanese Laid-open Patent Publication No. 2007-82259
Patent Literature 2: Japanese Laid-open Patent Publication No. 2009-112023
Patent Literature 3: Japanese Laid-open Patent Publication No. 08-154097

However, the above-described conventional technology has a problem that a wireless resource is constantly occupied by a particular mobile terminal unit. Specifically, in the conventional technology to assign a fixed access slot to a particular mobile terminal unit, the other mobile terminal units do not use the access slot assigned to the particular mobile terminal unit. As an access slot is a wireless resource, if the access slot is constantly occupied by a particular mobile terminal unit, which means the wireless resource is constantly occupied by the particular mobile terminal unit.

SUMMARY

According to an aspect of the embodiments, a wireless communication system includes a base station unit that performs wireless communication with a mobile terminal unit, and a management device that manages the base station unit. The management device includes a managing unit that manages whether a dedicated access slot different from an access slot is assigned to the mobile terminal unit, the access slot being arbitrarily used by the mobile terminal unit when the mobile terminal unit gets random access to the base station unit, a selecting unit that selects a dedicated access slot which has not been assigned among dedicated access slots managed by the managing unit when having received a priority notification indicating that a mobile terminal unit being a communicating destination of the base station unit is a priority terminal given priority for performing communication, and an instructing unit that instructs the base station unit managed by the management device to reserve the dedicated access slot selected by the selecting unit. The base station unit includes an assigning unit that assigns the dedicated access slot instructed by the instructing unit to the priority terminal. The mobile terminal unit includes a storage unit that stores therein information indicating the dedicated access slot assigned by the assigning unit, and a communication unit that gets random access to the base station unit through the dedicated access slot indicated by the information stored in the storage unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 13 is a diagram illustrating an example of the number of dedicated access slots assigned to multiple UEs;

FIG. 14 is a flowchart illustrating a procedure of a dedicated-access-slot selecting process performed by the MME when one dedicated access slot is assigned to multiple UEs;

FIG. 15 is a sequence diagram illustrating an example of wireless communication processing performed by a wireless communication system according to a third embodiment;

DESCRIPTION OF EMBODIMENTS

Exemplary embodiments of a wireless communication system, management device, mobile terminal unit, and wireless communication method according to the present invention are explained in detail below with reference to accompanying drawings. Incidentally, the wireless communication system, management device, mobile terminal unit, and wireless communication method according to the present invention are not limited to the embodiments.

[a] First Embodiment

Figure 1:
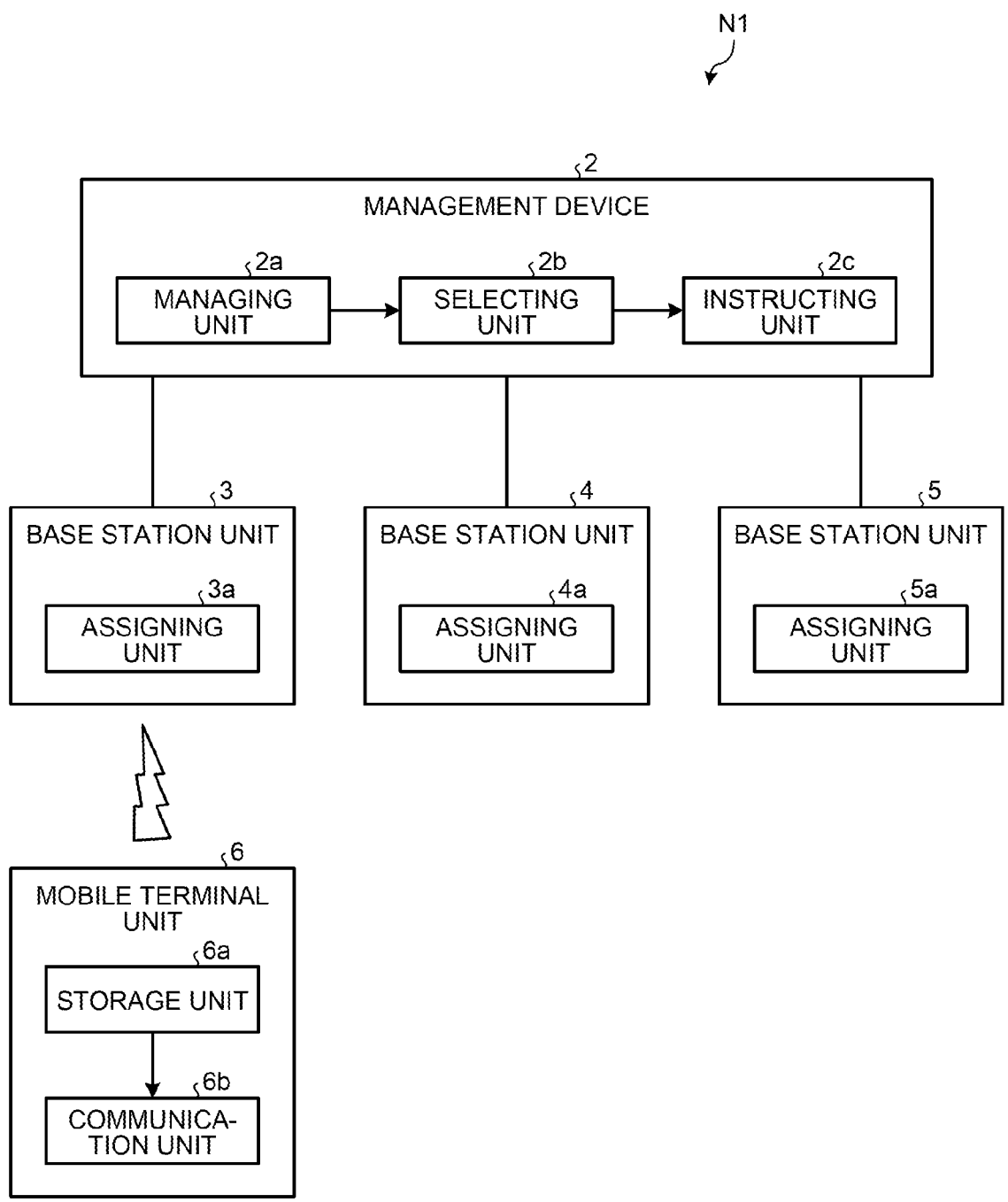
FIG. 1 is a block diagram illustrating a configuration example of a wireless communication system according to a first embodiment.

First, a wireless communication system according to a first embodiment is explained with reference to FIG. 1. FIG. 1 is a block diagram illustrating a configuration example of the wireless communication system according to the first embodiment. As illustrated in FIG. 1, a wireless communication system N1 according to the first embodiment includes a management device 2 and base station units 3 to 5.

In the wireless communication system N1 illustrated in FIG. 1, a mobile terminal unit 6 performs wireless communication with the base station units 3 to 5. For example, when the mobile terminal unit 6 initiates communication with any of the base station units 3 to 5, the mobile terminal unit 6 gets random access to the base station unit. At this time, the mobile terminal unit 6 gets random access to the base station unit through an arbitrary access slot out of multiple access slots divided into predetermined time domains. Incidentally, hereinafter, an access slot that a mobile terminal unit arbitrarily uses in random access may be referred to as an "arbitrary access slot".

The management device 2 manages the base station units 3 to 5. In the example illustrated in FIG. 1, the base station units 3 to 5 managed by the management device share common access slots. Incidentally, FIG. 1 illustrates an example in which the management device 2 manages three base station units 3 to 5. However, the management device 2 can manage one or two base station units, or can manage four or more base station units.

As illustrated in FIG. 1, the management device 2 includes a managing unit 2a, a selecting unit 2b, and an instructing unit 2c. The managing unit 2a manages whether a mobile terminal unit has been assigned a dedicated access slot. Incidentally, the "dedicated access slot" here indicates, for example, an access slot that a mobile terminal unit can use after an instruction is made by the management device 2 or the like, unlike an arbitrary access slot arbitrarily used by the mobile terminal unit.

The selecting unit 2b selects a dedicated access slot which has not been assigned out of dedicated access slots managed by the managing unit 2a when having received a notification indicating a mobile terminal unit given priority for performing communication from the mobile terminal unit 6 or an external device (not illustrated), etc. Incidentally, hereinafter, a mobile terminal unit given priority for performing communication may be referred to as a "priority terminal", and a notification indicating that a certain mobile terminal unit is the priority terminal may be referred to as a "priority notification".

The instructing unit 2c instructs the base station units 3 to 5 managed by the management device 2 to reserve a dedicated access slot selected by the selecting unit 2b. For example, when a dedicated access slot of which the access slot number is "N" is selected by the selecting unit 2b, the instructing unit 2c instructs the base station units 3 to 5 to reserve an access slot with the access slot number "N".

Furthermore, as illustrated in FIG. 1, the base station unit 3 includes an assigning unit 3a, the base station unit 4 includes an assigning unit 4a, and the base station unit 5 includes an assigning unit 5a. The assigning units 3a, 4a, and 5a reserve a dedicated access slot in accordance with a reserve instruction from the instructing unit 2c of the management device 2, and assign the reserved dedicated access slot to a priority terminal.

Moreover, as illustrated in FIG. 1, the mobile terminal unit 6 includes a storage unit 6a and a communication unit 6b. The storage unit 6a stores therein information indicating a dedicated access slot assigned by the assigning units 3a, 4a, and 5a of the base station units 3 to 5. For example, the storage unit 6a stores therein an access slot number of the dedicated access slot assigned by the assigning units 3a, 4a, and 5a. The communication unit 6b gets random access to the base station units 3 to 5 through the dedicated access slot that the information stored in the storage unit 6a indicates.

As described above, in the wireless communication system N1 according to the first embodiment, when having received a priority notification that the mobile terminal unit 6 is a priority terminal, the management device 2 selects a dedicated access slot to be assigned to the mobile terminal unit 6. Then, the base station units 3 to reserve the dedicated access slot selected by the management device 2. Then, the mobile terminal unit 6 stores information indicating the reserved dedicated access slot in the storage unit 6a, and will use the access slot that the information stored in the storage unit 6a indicates when getting random access to the base station unit.

In this manner, when the wireless communication system N1 according to the first embodiment has been notified of a priority terminal, the wireless communication system N1 reserves a dedicated access slot for the priority terminal. Consequently, the wireless communication system N1 according to the first embodiment does not constantly assign a fixed access slot to a particular mobile terminal unit, and therefore can prevent an access slot from being constantly occupied by a particular mobile terminal unit. Furthermore, in the wireless communication system N1 according to the first embodiment, a dedicated access slot is assigned to a priority terminal, so it is possible to prevent a random access contention between the priority terminal and the other mobile terminal units other than the priority terminal. From the above, the wireless communication system N1 according to the first embodiment can prevent a wireless resource from being constantly occupied and also prevent a random access contention.

[b] Second Embodiment

In a second embodiment, there will be described an example of a wireless communication system that performs a process of releasing a dedicated access slot assigned to a priority terminal and a process of assigning a dedicated access slot when a base station unit of a device being in communication with a priority terminal has changed. Incidentally, in the second embodiment described below, there is described an example where the wireless communication system disclosed in the present application is applied to a wireless communication system based on LTE (Long Term Evolution). However, the wireless communication system disclosed in the present application can also be applied to a wireless communication system based on another communication method other than LTE, such as WCDMA (Wideband Code Division Multiple Access).

Configuration of Wireless Communication System According to Second Embodiment

Figure 2:
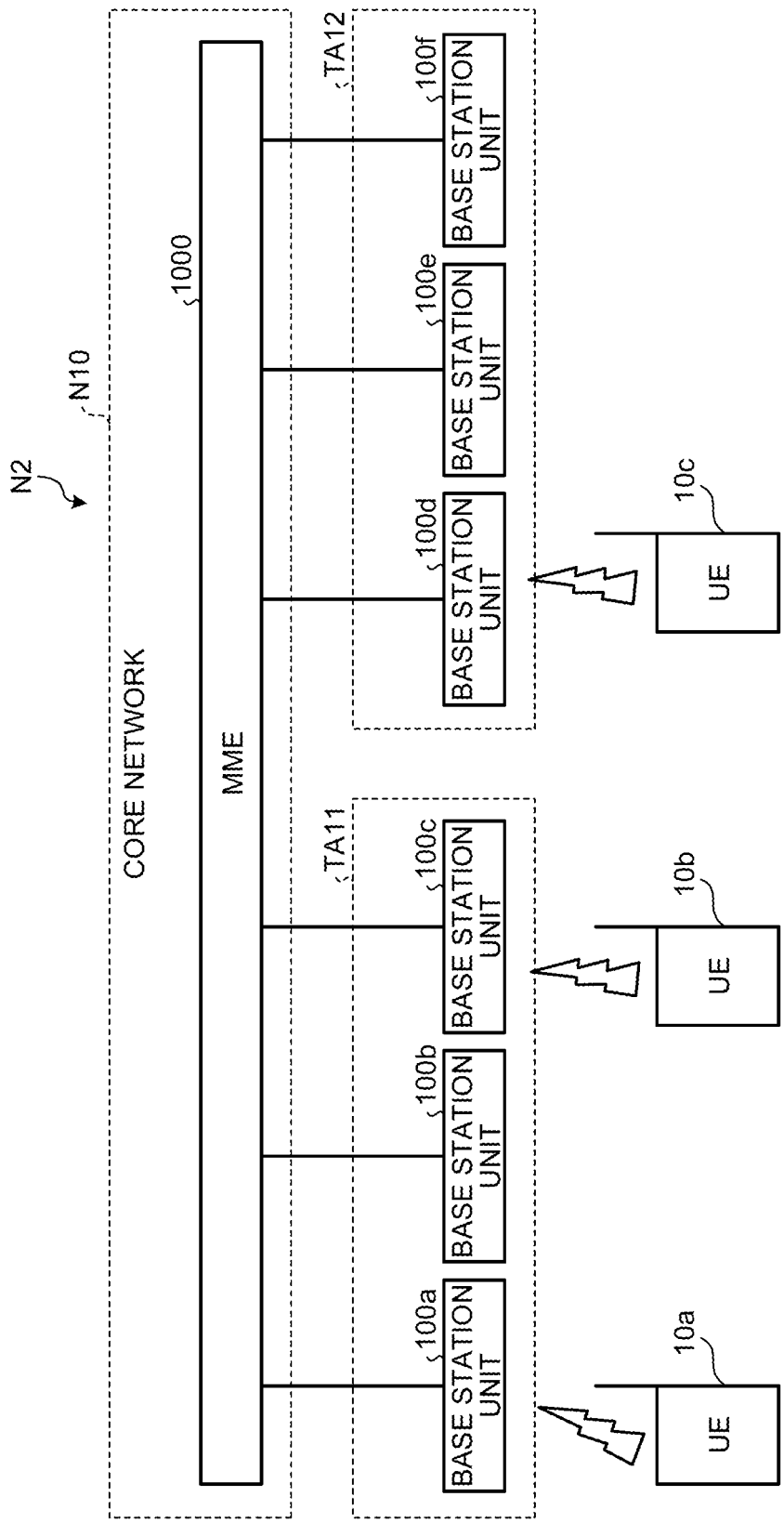
FIG. 2 is a block diagram illustrating a configuration example of a wireless communication system according to a second embodiment.

First, a wireless communication system according to the second embodiment is explained with reference to FIG. 2. FIG. 2 is a block diagram illustrating a configuration example of the wireless communication system according to the second embodiment. As illustrated in FIG. 2, a wireless communication system N2 according to the second embodiment includes an MME (Mobility Management Entity) 1000 and base station units 100a to 100f.

In the wireless communication system N2 illustrated in FIG. 2, a UE (User Equipment) 10a, which is a mobile terminal unit, performs wireless communication with the base station unit 100a, and a UE 10b performs wireless communication with the base station unit 100c, and then a UE 10c performs wireless communication with the base station unit 100d. Incidentally, the UEs 10a to 10c correspond to the mobile terminal unit 6 illustrated in FIG. 1.

In the example illustrated in FIG. 2, the MME 1000 is placed within a core network N10, and manages the base station units 100a to 100f. The MME 1000 corresponds to the management device 2 illustrated in FIG. 1. Furthermore, in the example illustrated in FIG. 2, the base station units 100a to 100c form a tracking area TA11, and the base station units 100d to 100f form a tracking area TA12. Namely, the base station units 100a to 100c share a common access slot, and the base station units 100d to 100f share a common access slot.

Figure 3:
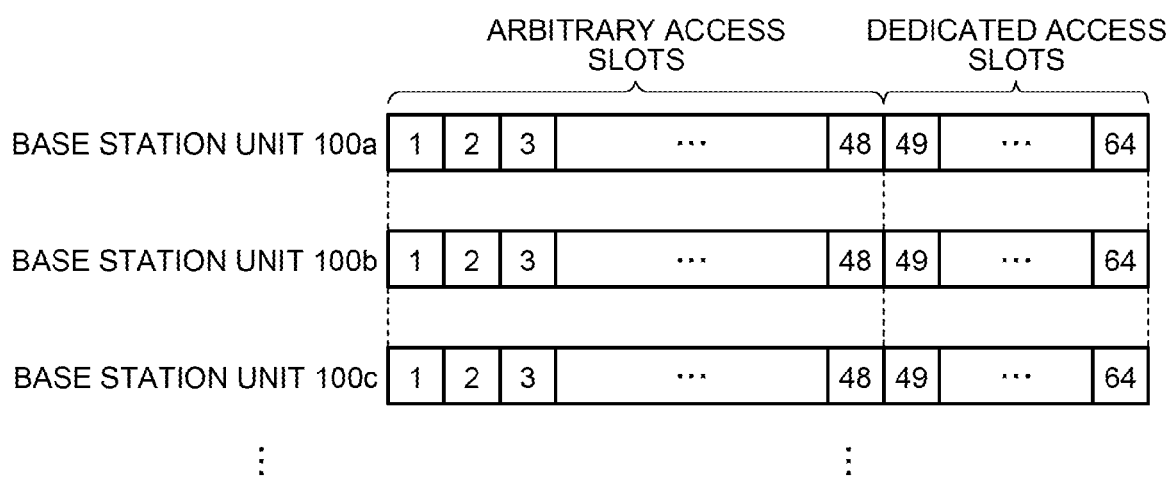
FIG. 3 is a diagram schematically illustrating an example of access slots in the second embodiment.

Here, the access slot shared by the base station units 100a to 100c is explained with reference to FIG. 3. FIG. 3 is a diagram schematically illustrating an example of access slots in the second embodiment. In the example illustrated in FIG. 3, forty-eight access slots with access slot numbers "1" to "48" are arbitrary access slots, and sixteen access slots with access slot numbers "49" to "64" are dedicated access slots. As illustrated in FIG. 3, the access slots are shared by the base station units 100a to 100c forming the same tracking area TA11.

Out of these access slots, an arbitrary access slot is used at the time of random access initiated by a mobile terminal unit. Specifically, the mobile terminal unit randomly selects one arbitrary access slot from a predetermined available arbitrary access slot group, and gets random access to a base station unit. Therefore, if multiple mobile terminal units use the same arbitrary access slot at the same timing, a contention may occur. Consequently, it could be said that random access by the mobile terminal unit 6 is contention-based random access.

On the other hand, a dedicated access slot is used at the time of random access initiated by a control station, such as the management device 2. For example, a mobile terminal unit gets random access to a base station unit using a dedicated access slot assigned by the base station unit. Such a dedicated access slot is used, for example, when handover processing is performed.

Figure 4:
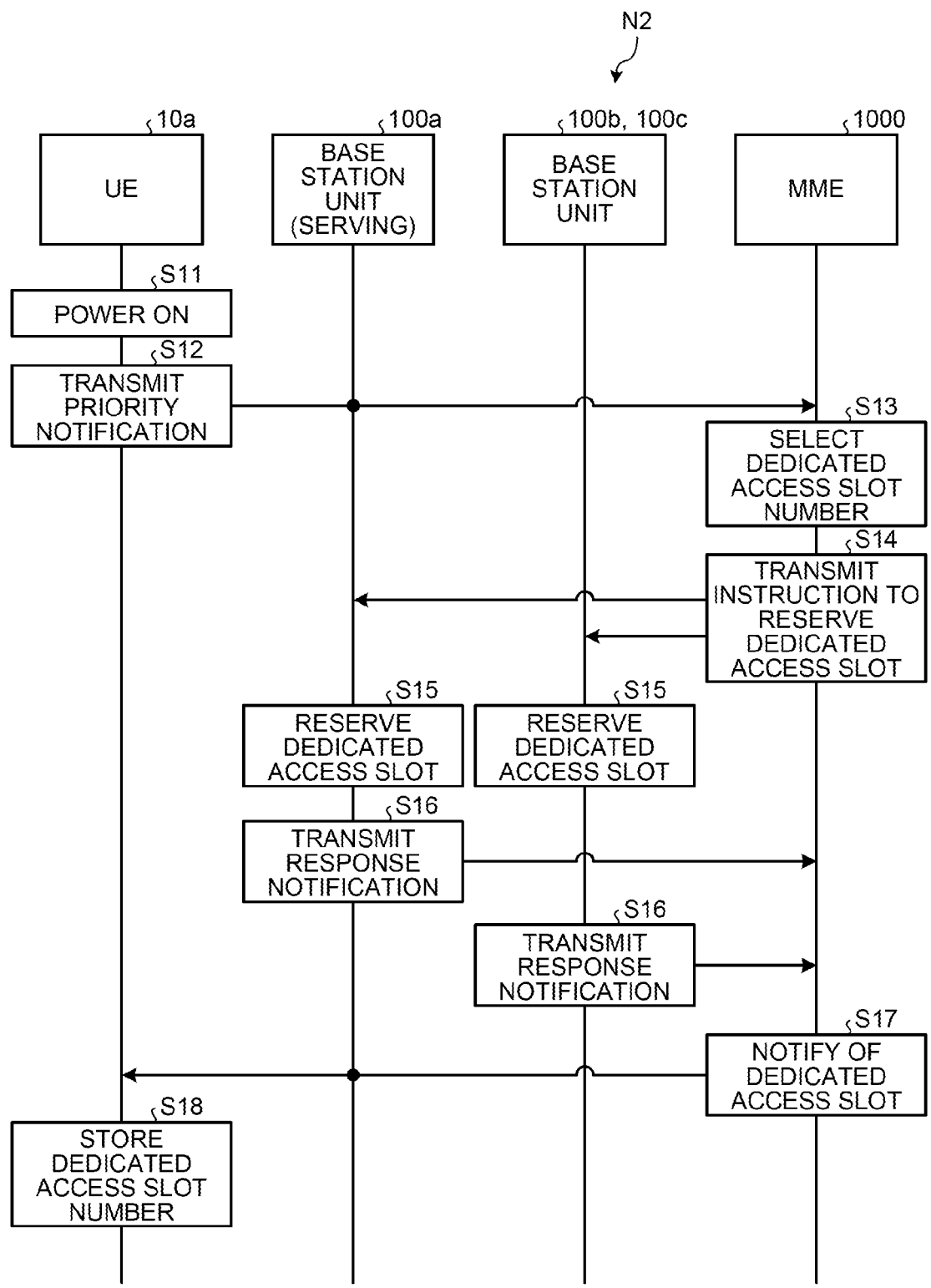
FIG. 4 is a sequence diagram illustrating an example of wireless communication processing performed by the wireless communication system according to the second embodiment.
Figure 5:
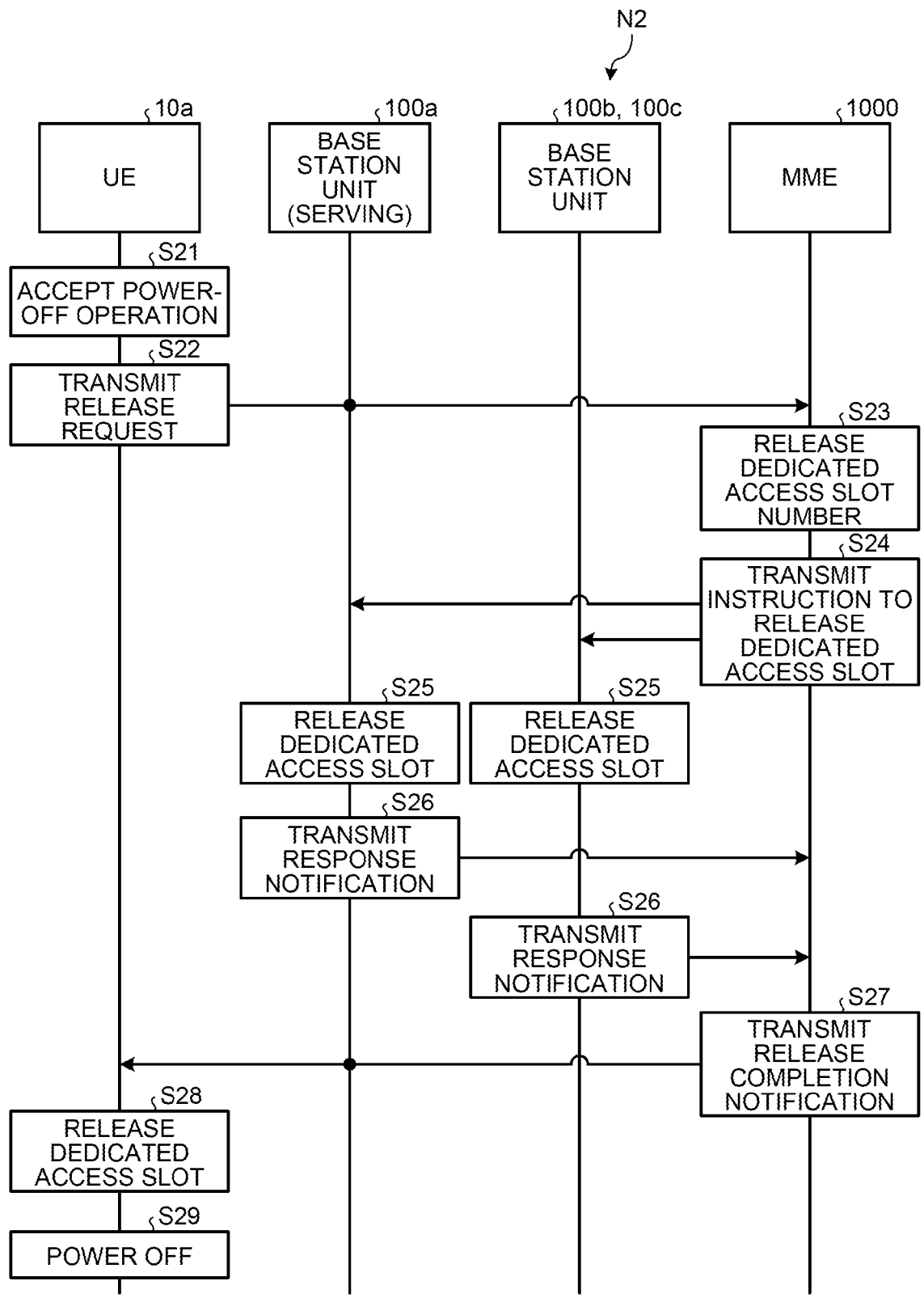
FIG. 5 is a sequence diagram illustrating an example of wireless communication processing performed by the wireless communication system according to the second embodiment.
Figure 6:
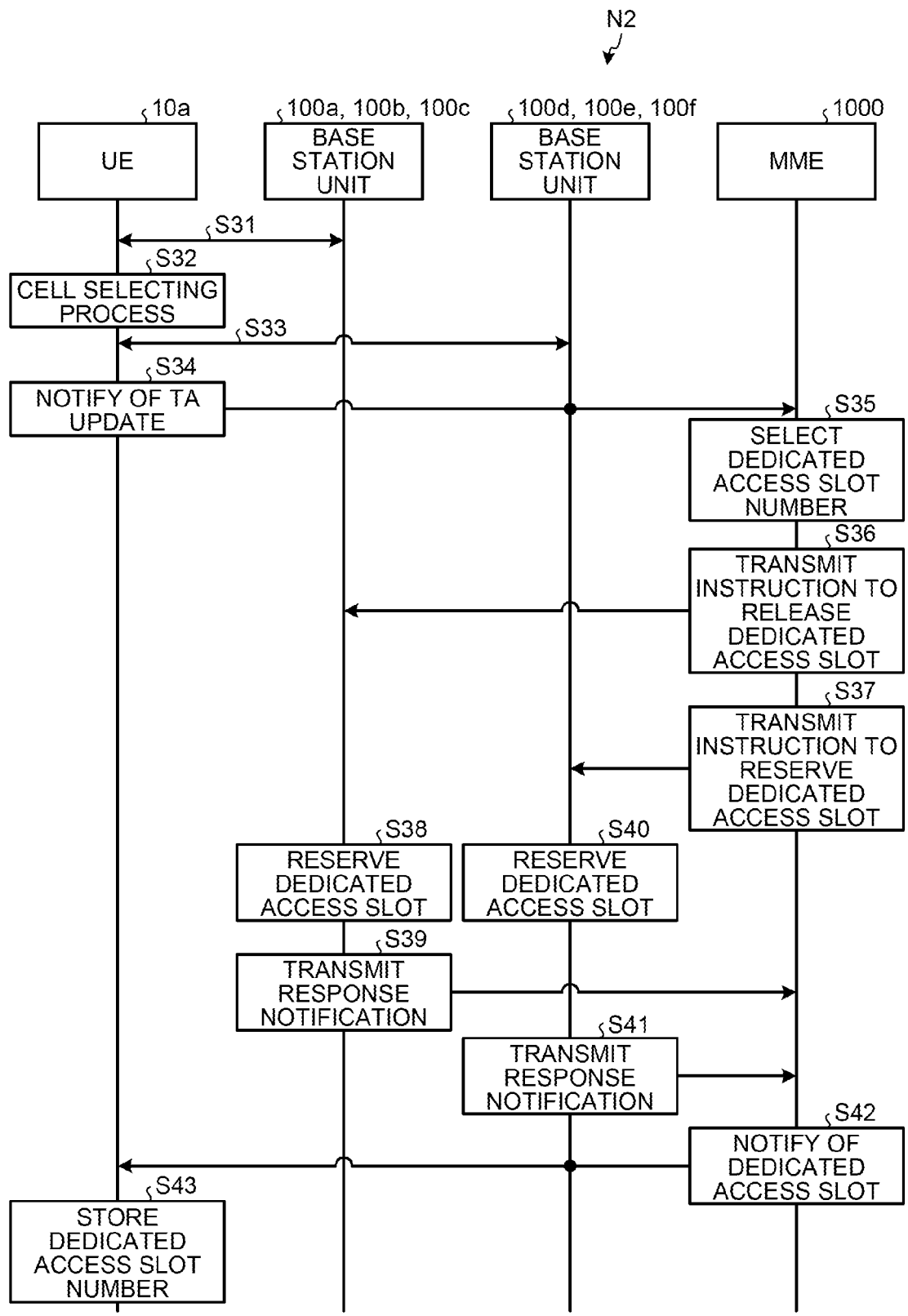
FIG. 6 is a sequence diagram illustrating an example of wireless communication processing performed by the wireless communication system according to the second embodiment.

Wireless Communication Processing Performed by Wireless Communication System According to Second Embodiment Subsequently, wireless communication processing performed by the wireless communication system N2 according to the second embodiment is explained with reference to FIGS. 4 to 6. FIGS. 4 to 6 are sequence diagrams illustrating examples of wireless communication processing performed by the wireless communication system N2 according to the second embodiment. Incidentally, in the examples illustrated in FIGS. 4 to 6, the UE 10a is a priority terminal.

First, wireless communication processing illustrated in FIG. 4 is explained. In FIG. 4, as an example, there is described a case where the UE 10a illustrated in FIG. 2 is powered on. As illustrated in FIG. 4, when the UE 10a falls into a power-ON state, for example, by a power-ON operation made by a user (Step S11), the UE 10a transmits a priority notification to the MME 1000 via the base station unit 100a which is a serving base station (Step S12).

Upon receipt of the priority notification, the MME 1000 selects a dedicated access slot to be assigned to the UE 10a (Step S13). Specifically, the MME 1000 selects a dedicated access slot which has not been assigned to another UE out of multiple dedicated access slots. Then, the MME 1000 transmits a "reserve instruction", which is an instruction to reserve the dedicated access slot selected at Step S13, to the base station units 100a to 100c (Step S14). At this time, the MME 1000 transmits a reserve instruction including an access slot number of the dedicated access slot to be reserved.

The reason why the MME 1000 transmits a reserve instruction to the base station units 100a to 100c in this way is because the base station units 100a to 100c have formed the one tracking area TA11 and managed the shared access slots. Namely, the MME 1000 transmits a reserve instruction to the base station units 100a to 100c, thereby preventing the dedicated access slot selected at Step S13 from being used by another UE other than the UE 10a within the tracking area TA11.

Upon receipt of the reserve instruction, the base station units 100a to 100c reserve the dedicated access slot (Step S15). Then, the base station units 100a to 100c transmit a response notification indicating that the base station unit has reserved the dedicated access slot to the MME 1000 (Step S16). Upon receipt of the response notification, the MME 1000 notifies the UE 10a of an access slot number of the dedicated access slot selected at Step S13 via the base station unit 100a which is a serving base station of the UE 10a (Step S17).

The UE 10a stores the access slot number of the dedicated access slot received from the MME 1000 in a storage unit thereof (Step S18). When getting random access to the base station unit 100a later on, the UE 10a uses the dedicated access slot indicated by the access slot number stored in the storage unit. The dedicated access slot is not used by another UE other than the UE 10*a*; therefore, once the UE 10*a* has reserved the dedicated access slot, the UE 10*a* can get random access to the base station unit 100*a* without being in contention with another UE.

Subsequently, wireless communication processing illustrated in FIG. 5 is explained. In FIG. 5, as an example, there is described a case where the UE 10*a* illustrated in FIG. 2 has been powered off. As illustrated in FIG. 5, when the UE 10*a* has accepted a power-OFF operation made by a user (Step S21), the UE 10*a* transmits a release request to the MME 1000 via the base station unit 100*a* which is a serving base station (Step S22). The "release request" here indicates a request to release a dedicated access slot assigned to a UE.

Upon receipt of the release request, the MME 1000 releases a dedicated access slot assigned to the UE 10*a* (Step S23). Then, the MME 1000 transmits a "release instruction", which is an instruction to release the dedicated access slot released at Step S23, to the base station units 100*a* to 100*c* (Step S24). At this time, the MME 1000 transmits a release instruction including an access slot number of the dedicated access slot to be released.

The reason why the MME 1000 transmits a release instruction to the base station units 100*a* to 100*c* in this way is because the dedicated access slot has been reserved by the base station units 100*a* to 100*c*. Namely, the MME 1000 transmits a release instruction to the base station units 100*a* to 100*c*, thereby releasing the dedicated access slot which is a wireless resource. Consequently, the other UEs become able to use the dedicated access slot assigned to the UE 10*a*.

Upon receipt of the release instruction, the base station units 100*a* to 100*c* release the dedicated access slot in accordance with the release instruction (Step S25). Then, the base station units 100*a* to 100*c* transmit a response notification indicating that the base station unit has released the dedicated access slot to the MME 1000 (Step S26). Upon receipt of the response notification, the MME 1000 transmits a release completion notification indicating that release of the dedicated access slot has been completed to the UE 10*a* via the base station unit 100*a* which is a serving base station (Step S27).

Then, upon receipt of the release completion notification, the UE 10*a* deletes an access slot number of the dedicated access slot assigned to the UE 10*a* from a storage unit thereof. As a result, the UE 10*a* releases the dedicated access slot (Step S28). Then, the UE 10*a* falls into a power-OFF state (Step S29). Namely, the UE 10*a* performs a process of releasing the dedicated access slot during a period of time from when the UE 10*a* has accepted the power-OFF operation till when the UE 10*a* falls into the power-OFF state.

In this manner, the wireless communication system N2 according to the second embodiment releases a dedicated access slot assigned to a UE which has been subjected to a power-OFF operation. Namely, the wireless communication system N2 according to the second embodiment does not assign a dedicated access slot to a UE which does not perform wireless communication, and therefore can prevent a wireless resource from being constantly occupied.

Subsequently, wireless communication processing illustrated in FIG. 6 is explained. In FIG. 6, as an example, there is described a case where a serving base station of the UE 10*a* illustrated in FIG. 2 has been changed. Incidentally, hereinafter, multiple base stations forming a shared tracking area may be referred to as a "base station group". For example, the base station units 100*a* to 100*c* forming the tracking area TA11 are one base station group, and the base station units 100*d* to 100*f* forming the tracking area TA12 are one base station group.

In the example illustrated in FIG. 6, at first the UE 10*a* is located within a paging area provided by the base station unit 100*a*. Namely, the UE 10*a* is located within the tracking area TA11 formed by the base station units 100*a* to 100*c*. As the UE 10*a* is a priority terminal, the UE 10*a* is assigned a predetermined dedicated access slot shared by the base station units 100*a* to 100*c*. The UE 10*a* is in a standby state in which the UE 10*a* can get into wireless communication with the base station unit 100*a* (Step S31).

Next, the UE 10*a* is moved into a paging area provided by the base station unit 100*d*. Namely, the UE 10*a* is located within the tracking area TA12 formed by the base station units 100*d* to 100*f*. In this case, the UE 10*a* performs a cell selecting process on the basis of various information transmitted from the base station unit 100*a* and the base station unit 100*d* or the like (Step S32).

Here, the UE 10*a* selects the base station unit 100*d* as a serving base station, and falls into a standby state in which the UE 10*a* can get into wireless communication with the base station unit 100*d* (Step S33). In this case, the UE 10*a* transmits TA (Tracking Area) update to the MME 1000 via the base station unit 100*d* which is a serving base station (Step S34).

At the time when the UE 10*a* has transmitted the TA update, the dedicated access slot assigned to the UE 10*a* is an access slot shared by the base station units 100*a* to 100*c*. Such a dedicated access slot is not an access slot shared by the base station units 100*d* to 100*f*. Namely, a dedicated access slot assigned to the UE 10*a* out of dedicated access slots shared by the base station units 100*d* to 100*f* is likely to have already been assigned to another UE. In other words, an access slot number of the dedicated access slot assigned to the UE 10*a* is likely to be identical to an access slot number of a dedicated access slot which has already been assigned in the tracking area TA12.

Therefore, when having accepted the TA update, the MME 1000 selects a dedicated access slot to be assigned to the UE 10*a* (Step S35). At this time, the MME 1000 first determines whether an access slot number identical to an access slot number of the dedicated access slot currently assigned to the UE 10*a* is available. This is because if the identical access slot number can be used, the UE 10*a* does not have to update the access slot number stored therein even when the UE 10*a* moves into another tracking area. Incidentally, a dedicated-access-slot selecting process performed by the MME 1000 will be described in detail later with reference to FIG. 11.

Then, the MME 1000 transmits a release instruction to release the dedicated access slot currently assigned to the UE 10*a* to the base station units 100*a* to 100*c* (Step S36). Furthermore, the MME 1000 transmits a reserve instruction to reserve the dedicated access slot selected at Step S35 to the base station units 100*d* to 100*f* (Step S37).

Upon receipt of the release instruction, the base station units 100*a* to 100*c* release the dedicated access slot assigned to the UE 10*a* (Step S38), and transmit a response notification indicating that the base station unit has released the dedicated access slot to the MME 1000 (Step S39). Furthermore, upon receipt of the reserve instruction, the base station units 100*d* to 100*f* reserve the dedicated access slot selected at Step S35 (Step S40), and transmit a response notification indicating that the base station unit has reserved the dedicated access slot to the MME 1000 (Step S41).

Upon receipt of the response notifications from the base station units 100*a* to 100*f*, the MME 1000 notifies the UE 10*a* of an access slot number of the dedicated access slot selected at Step S35 via the base station unit 100*d* which is a serving base station (Step S42).

Then, the UE 10*a* updates the dedicated access slot number stored in the storage unit to the access slot number of the dedicated access slot received from the MME 1000 (Step S43). Consequently, even when the tracking area in which the UE 10*a* is located is changed, the UE 10*a* can get random access by using a dedicated access slot which can be used in a tracking area into which the UE 10*a* is moved. Namely, the UE 10*a* can get random access to the base station unit 100*d* without being in contention with another UE. Furthermore, the UE 10*a* can release a dedicated access slot assigned to the UE 10*a* in the tracking area in which the UE 10*a* was located before moving into another tracking area; therefore, it is possible to prevent occupation of a wireless resource.

Incidentally, when there is no change in an access slot number of a dedicated access slot to be assigned to the UE 10*a*, the MME 1000 does not have to perform the notifying process at Step S42. Accordingly, the process of updating the dedicated access slot number performed by the UE 10*a* can be omitted; therefore, it is possible to reduce the processing load on the UE 10*a*.

Configurations of UE, Base Station Unit, and MME in Second Embodiment

Subsequently, configurations of the UEs 10*a* to 10*c*, the base station units 100*a* to 100*f*, and the MME 1000 in the second embodiment are explained. Incidentally, in the explanation below, the UEs 10*a* to 10*c* are collectively referred to as the UE 10 unless otherwise specified. Furthermore, the base station units 100*a* to 100*f* are collectively referred to as the base station unit 100 unless otherwise specified.

Configuration of UE in Second Embodiment

Figure 7:
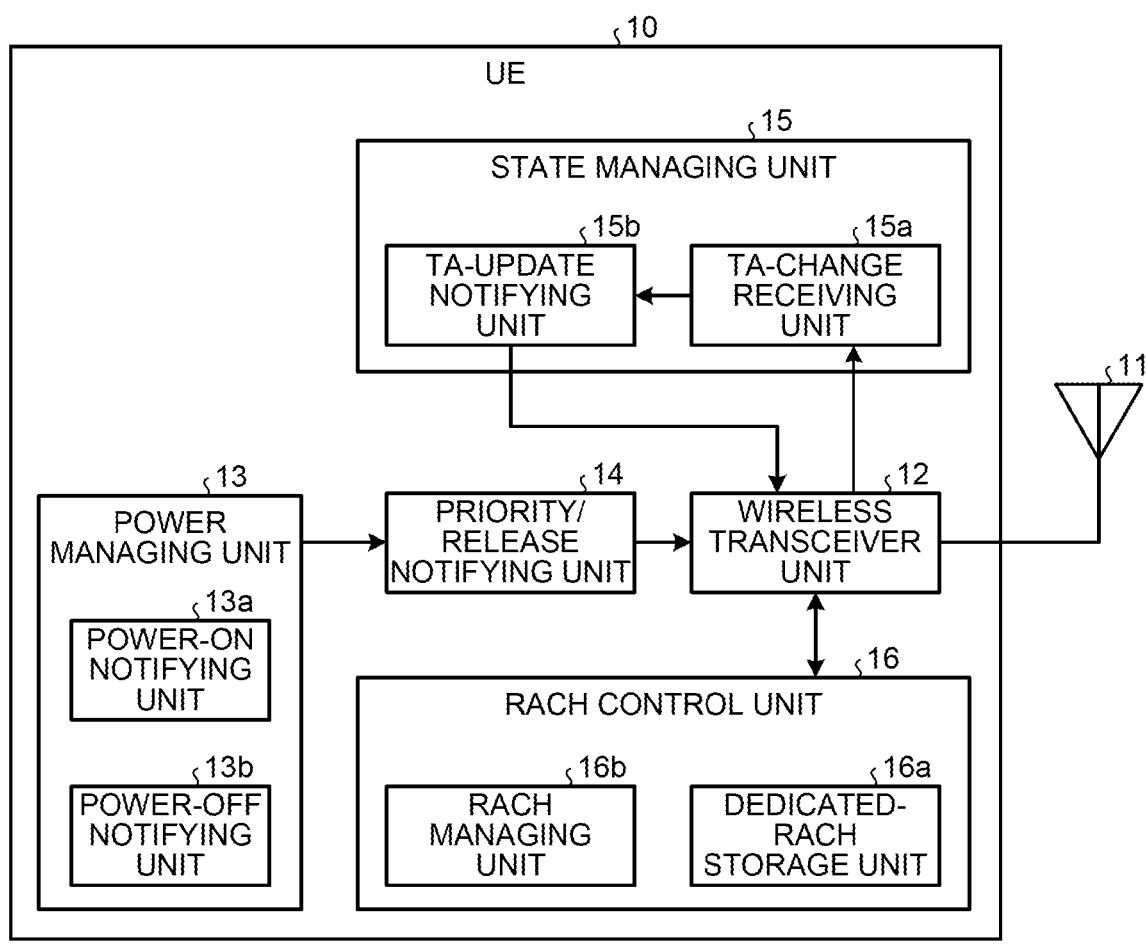
FIG. 7 is a block diagram illustrating a configuration example of a UE in the second embodiment.

First, the configuration of the UE 10 in the second embodiment is explained with reference to FIG. 7. FIG. 7 is a block diagram illustrating a configuration example of the UE 10 in the second embodiment. As illustrated in FIG. 7, the UE 10 in the second embodiment includes an antenna 11, a wireless transceiver unit 12, a power managing unit 13, a priority/release notifying unit 14, a state managing unit 15, and an RACH control unit 16.

The antenna 11 transmits various signals into the air, thereby transmitting the various signals to the base station unit 100 and receives a signal transmitted from the base station unit 100. The wireless transceiver unit 12 transmits and receives a wireless signal via the antenna 11.

The power managing unit 13 manages the power to the UE 10. Specifically, the power managing unit 13 includes a power-ON notifying unit 13*a* and a power-OFF notifying unit 13*b*. When the UE 10 is powered ON, the power-ON notifying unit 13*a* notifies the priority/release notifying unit 14 of the UE 10 having been powered ON. For example, when a power-ON operation or the like has been made by a user, the power-ON notifying unit 13*a* notifies the priority/release notifying unit 14 of the UE 10 having been powered ON. When the power to the UE 10 is turned OFF, the power-OFF notifying unit 13*b* notifies the priority/release notifying unit 14 of the power to the UE being turned OFF. For example, when a power-OFF operation or the like has been made by a user, the power-OFF notifying unit 13*b* notifies the priority/release notifying unit 14 of the power to the UE 10 being turned OFF.

The priority/release notifying unit 14 notifies the MME 1000 of a priority notification and a release request via a serving base station. Specifically, when having notified of information indicating power-ON by the power-ON notifying unit 13*a*, the priority/release notifying unit 14 transmits a priority notification to the MME 1000 via the wireless transceiver unit 12. Namely, as in the example illustrated at Step S12 in FIG. 4, the priority/release notifying unit 14 transmits a priority notification when the UE 10 has been powered ON. Furthermore, when having notified of information indicating power-OFF by the power-OFF notifying unit 13*b*, the priority/release notifying unit 14 transmits a release request to the MME 1000 via the wireless transceiver unit 12. Namely, as in the example illustrated at Step S22 in FIG. 5, the priority/release notifying unit 14 transmits a release request when the power to the UE 10 is turned OFF.

The state managing unit 15 manages location information of the UE 10, a tracking area in which the UE is located, and the like. Specifically, the state managing unit 15 includes a TA-change receiving unit 15*a* and a TA-update notifying unit 15*b*.

The TA-change receiving unit 15*a* receives a tracking-area change notification transmitted from a destination base station unit 100, for example, when the tracking area in which the UE 10 is located is changed as a result of movement of the UE 10. The TA-change receiving unit 15*a* notifies the TA-update notifying unit 15*b* of the tracking-area change notification.

The TA-update notifying unit 15*b* transmits TA update to the MME 1000 when having received a tracking-area change notification from the TA-change receiving unit 15*a*. For example, as in the example illustrated at Step S34 in FIG. 6, when the tracking area in which the UE 10 is located is changed from the tracking area TA11 to the tracking area TA12, the TA-update notifying unit 15*b* transmits TA update to the MME 1000.

The RACH control unit 16 controls random access through an RACH. Specifically, the RACH control unit 16 includes a dedicated-RACH storage unit 16*a* and an RACH managing unit 16*b*.

The dedicated-RACH storage unit 16*a* stores therein an access slot number of a dedicated access slot. For example, as in the example illustrated at Step S18 in FIG. 4, when having received an access slot number of a dedicated access slot transmitted from the MME 1000, the RACH control unit 16 stores the access slot number in the dedicated-RACH storage unit 16*a*. Furthermore, for example, as in the example illustrated at Step S28 in FIG. 5, when having received a release completion notification transmitted from the MME 1000, the RACH control unit 16 deletes an access slot number stored in the dedicated-RACH storage unit 16*a*. Moreover, for example, as in the example illustrated at Step S43 in FIG. 6, when having received an access slot number of a dedicated access slot transmitted from the MME 1000, the RACH control unit 16 updates the dedicated-RACH storage unit 16*a* with the received access slot number. Incidentally, the dedicated-RACH storage unit 16*a* corresponds to the storage unit 6*a* illustrated in FIG. 1.

The RACH managing unit 16*b* gets random access through an RACH. Specifically, when an access slot number has been stored in the dedicated-RACH storage unit 16*a*, the RACH managing unit 16*b* gets random access through an access slot indicated by the access slot number stored in the dedicated-RACH storage unit 16*a*. Furthermore, when an access slot number has not been stored in the dedicated-RACH storage unit 16*a*, the RACH managing unit 16*b* gets random access through an arbitrary access slot. Moreover, for example, when the UE 10 moves into another tracking area and handover processing is performed, the RACH managing unit 16*b* may get random access through a dedicated access slot specified by the base station unit 100. Incidentally, the RACH managing unit 16b and the wireless transceiver unit 12 correspond to the communication unit 6b illustrated in FIG. 1.

Configuration of Base Station Unit in Second Embodiment

Figure 8:
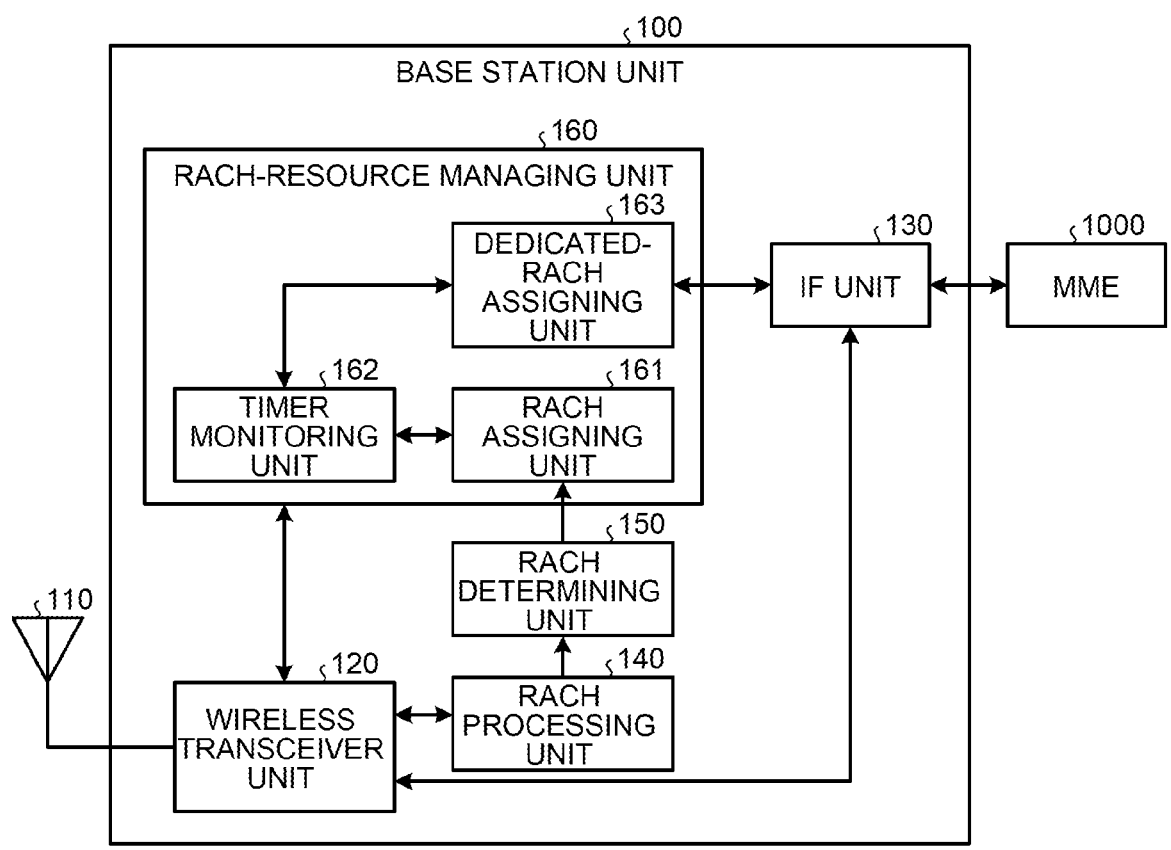
FIG. 8 is a block diagram illustrating a configuration example of a base station unit in the second embodiment.

Subsequently, the configuration of the base station unit 100 in the second embodiment is explained with reference to FIG. 8. FIG. 8 is a block diagram illustrating a configuration example of the base station unit 100 in the second embodiment. As illustrated in FIG. 8, the base station unit 100 in the second embodiment includes an antenna 110, a wireless transceiver unit 120, an interface (IF) unit 130, an RACH processing unit 140, an RACH determining unit 150, and an RACH-resource managing unit 160.

The antenna 110 transmits various signals into the air, thereby transmitting the various signals to the UE 10 and receives a signal transmitted from the UE 10. The wireless transceiver unit 120 outputs a signal received via the antenna 110 to the IF unit 130 and receives various signals from the IF unit 130. The IF unit 130 transmits and receives various signals with the MME 1000.

The RACH processing unit 140 processes various signals transmitted from the UE 10 through an RACH. Specifically, the RACH processing unit 140 performs random access processing with the UE 10, and, upon successful completion of the random access processing, the RACH processing unit 140 notifies the RACH determining unit 150 of an access slot used in the successfully-completed random access. Incidentally, the RACH processing unit 140 determines whether the random access processing has been completed successfully, for example, on the basis of a power level of a received signal or the like.

When the access slot notified by the RACH processing unit 140 is a dedicated access slot, the RACH determining unit 150 instructs to assign the dedicated access slot to the UE 10. For example, when the UE 10 performs handover, the RACH determining unit 150 is notified of a dedicated access slot by the RACH processing unit 140.

The RACH-resource managing unit 160 manages a state of assignment of an access slot. Specifically, the RACH-resource managing unit 160 includes an RACH assigning unit 161, a timer monitoring unit 162, and a dedicated-RACH assigning unit 163.

The RACH assigning unit 161 assigns a dedicated access slot to the UE 10 in accordance with an instruction from the RACH determining unit 150. For example, when the UE 10 performs handover, the RACH assigning unit 161 assigns a dedicated access slot notified by the RACH processing unit 140 to the UE 10.

The timer monitoring unit 162 monitors a time taken for handover processing or the like. For example, in LTE, it is determined that handover processing is to be completed until the expiry of a T304 timer. The timer monitoring unit 162 monitors whether the T304 timer has expired. When the timer monitoring unit 162 has determined that the T304 timer has expired, the above-described RACH assigning unit 161 assigns a dedicated access slot to the UE 10 even before the dedicated access slot is released.

The dedicated-RACH assigning unit 163 assigns a dedicated access slot to a priority terminal and releases a dedicated access slot assigned to a priority terminal. Specifically, when having received a reserve instruction to reserve a dedicated access slot from the MME 1000 via the IF unit 130, the dedicated-RACH assigning unit 163 reserves an access slot corresponding to an access slot number included in the reserve instruction. Then, upon completion of the reserve processing, the dedicated-RACH assigning unit 163 transmits a response notification indicating that the dedicated-RACH assigning unit 163 has reserved the dedicated access slot to the MME 1000. Incidentally, a dedicated-access-slot reserving process performed by the dedicated-RACH assigning unit 163 will be described in detail later with reference to FIG. 10.

Furthermore, when having received a release instruction to release a dedicated access slot from the MME 1000, the dedicated-RACH assigning unit 163 releases an access slot corresponding to an access slot number included in the release instruction. Then, upon completion of the release processing, the dedicated-RACH assigning unit 163 transmits a response notification indicating that the dedicated-RACH assigning unit 163 has released the dedicated access slot to the MME 1000.

Configuration of MME in Second Embodiment

Figure 9:
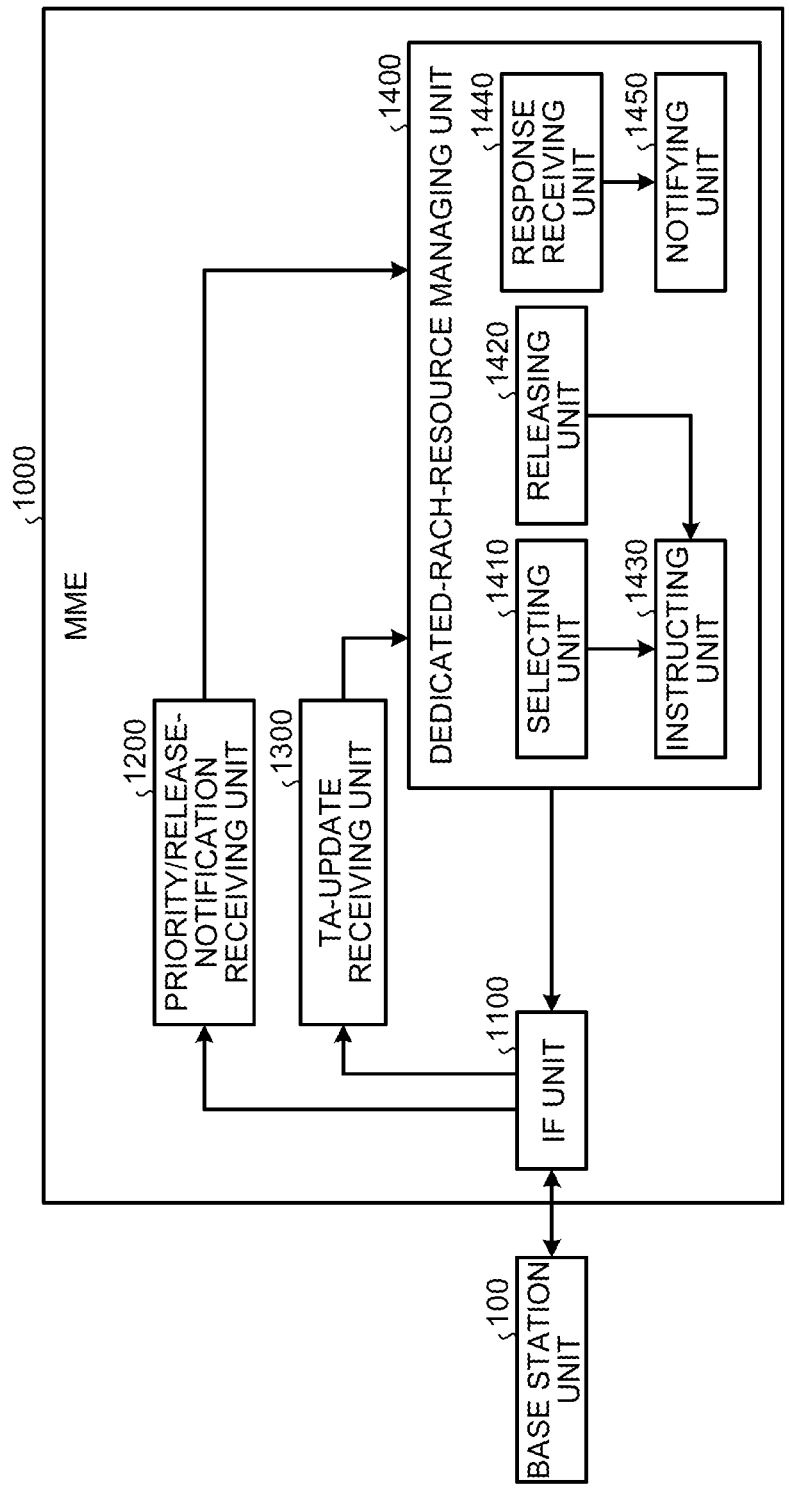
FIG. 9 is a block diagram illustrating a configuration example of an MME in the second embodiment.

Subsequently, the configuration of the MME 1000 in the second embodiment is explained with reference to FIG. 9. FIG. 9 is a block diagram illustrating a configuration example of the MME 1000 in the second embodiment. As illustrated in FIG. 9, the MME 1000 in the second embodiment includes an IF unit 1100, a priority/release-notification receiving unit 1200, a TA-update receiving unit 1300, and a dedicated-RACH-resource managing unit 1400.

The IF unit 1100 transmits and receives various signals with the base station unit 100. The priority/release-notification receiving unit 1200 receives a priority notification and release request transmitted from the priority/release notifying unit 14 of the UE 10 via the base station unit 100. Then, the priority/release-notification receiving unit 1200 notifies the dedicated-RACH-resource managing unit 1400 of the priority notification and release request received from the UE 10.

The TA-update receiving unit 1300 receives TA update transmitted from the TA-update notifying unit 15b of the UE 10 via the base station unit 100. Then, the TA-update receiving unit 1300 notifies the dedicated-RACH-resource managing unit 1400 of the TA update received from the UE 10.

The dedicated-RACH-resource managing unit 1400 manages a state of assignment of an access slot. Furthermore, the dedicated-RACH-resource managing unit 1400 instructs to reserve or release a dedicated access slot on the basis of a priority notification, a release request, or TA update transmitted from the UE 10. Specifically, the dedicated-RACH-resource managing unit 1400 includes a selecting unit 1410, a releasing unit 1420, an instructing unit 1430, a response receiving unit 1440, and a notifying unit 1450.

The selecting unit 1410 selects a dedicated access slot which has not been assigned to another UE upon receipt of a priority notification from the priority/release-notification receiving unit 1200 or upon receipt of TA update from the TA-update receiving unit 1300. At this time, the selecting unit 1410 selects a dedicated access slot which has not been assigned to another UE from dedicated access slots used by the base station unit 100 that has mediated the priority notification or TA update.

The releasing unit 1420 releases a dedicated access slot assigned to the UE 10 that has transmitted a release request when having received the release request from the priority/release-notification receiving unit 1200. Furthermore, when having received TA update from the TA-update receiving unit 1300, the releasing unit 1420 releases a dedicated access slot currently assigned to the UE that has transmitted the TA update. Namely, the releasing unit 1420 releases a dedicated access slot assigned in a tracking area in which the UE that has transmitted the TA update was located before moving into another tracking area.

When a dedicated access slot has been selected by the selecting unit 1410, the instructing unit 1430 transmits a reserve instruction, which is an instruction to reserve the dedicated access slot, to a base station group to which the base station unit 100 that has mediated a priority notification belongs. Furthermore, when a dedicated access slot has been released by the releasing unit 1420, the instructing unit 1430 transmits a release instruction, which is an instruction to release the dedicated access slot, to a base station group to which the base station unit 100 that has mediated a release request belongs.

The response receiving unit 1440 receives a response notification transmitted from the base station unit 100 that has responded to a reserve instruction or a release instruction. When the response receiving unit 1440 has received a response notification, the notifying unit 1450 notifies the UE 10 of information that a process of reserving or releasing a dedicated access slot has been completed. Specifically, when the response receiving unit 1440 has received a response notification indicating that a dedicated access slot has been reserved from the base station unit 100, the notifying unit 1450 notifies the UE 10 of an access slot number of the dedicated access slot selected by the selecting unit 1410.

Figure 10:
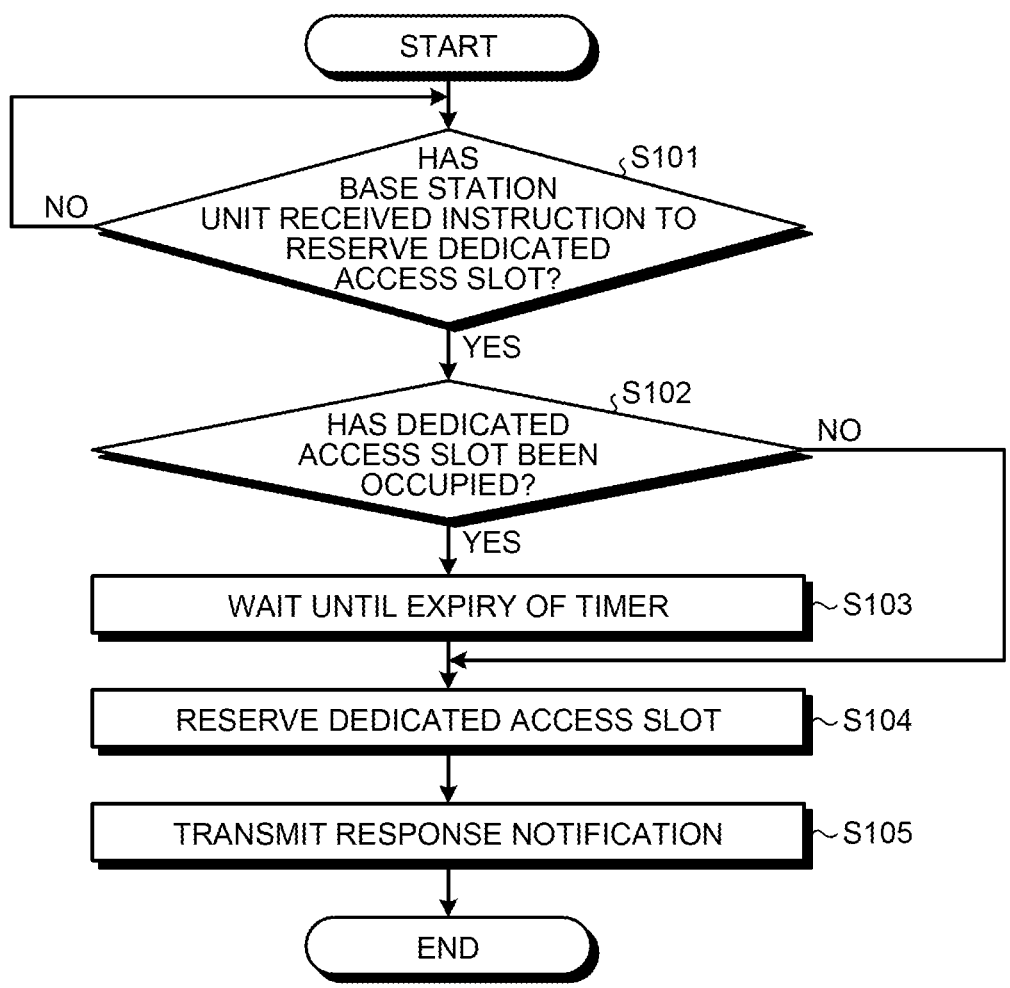
FIG. 10 is a flowchart illustrating a procedure of a dedicated-access-slot reserving process performed by the base station unit in the second embodiment.

Procedure of Reserving Process Performed by Base Station Unit in Second Embodiment Subsequently, a procedure of a dedicated-access-slot reserving process performed by the base station unit 100 in the second embodiment is explained with reference to FIG. 10. FIG. 10 is a flowchart illustrating the procedure of the dedicated-access-slot reserving process performed by the base station unit 100 in the second embodiment.

As illustrated in FIG. 10, when having received an instruction to reserve a dedicated access slot from the MME 1000 (YES at Step S101), the dedicated-RACH assigning unit 163 of the base station unit 100 determines whether the target dedicated access slot is in use (Step S102). Specifically, the dedicated-RACH assigning unit 163 determines whether a dedicated access slot indicated by an access slot number included in the reserve instruction has been assigned to another UE.

Then, when the dedicated access slot is in use (YES at Step S102), the dedicated-RACH assigning unit 163 waits until the expiry of the T304 timer being monitored by the timer monitoring unit 162 (Step S103). This is because the dedicated access slot is used by another UE other than a priority terminal at the time of handover processing. Then, the handover processing is completed until the expiry of the T304 timer, so the dedicated-RACH assigning unit 163 waits until the expiry of the T304 timer.

Then, the dedicated-RACH assigning unit 163 reserves the dedicated access slot indicated by the access slot number included in the reserve instruction (Step S104). On the other hand, when the dedicated access slot is not in use (NO at Step S102), the dedicated-RACH assigning unit 163 reserves the dedicated access slot without waiting until the expiry of the T304 timer (Step S104).

Then, after having reserved the dedicated access slot, the dedicated-RACH assigning unit 163 transmits a response notification indicating that the dedicated-RACH assigning unit 163 has reserved the dedicated access slot to the MME 1000 (Step S105).

Figure 11:
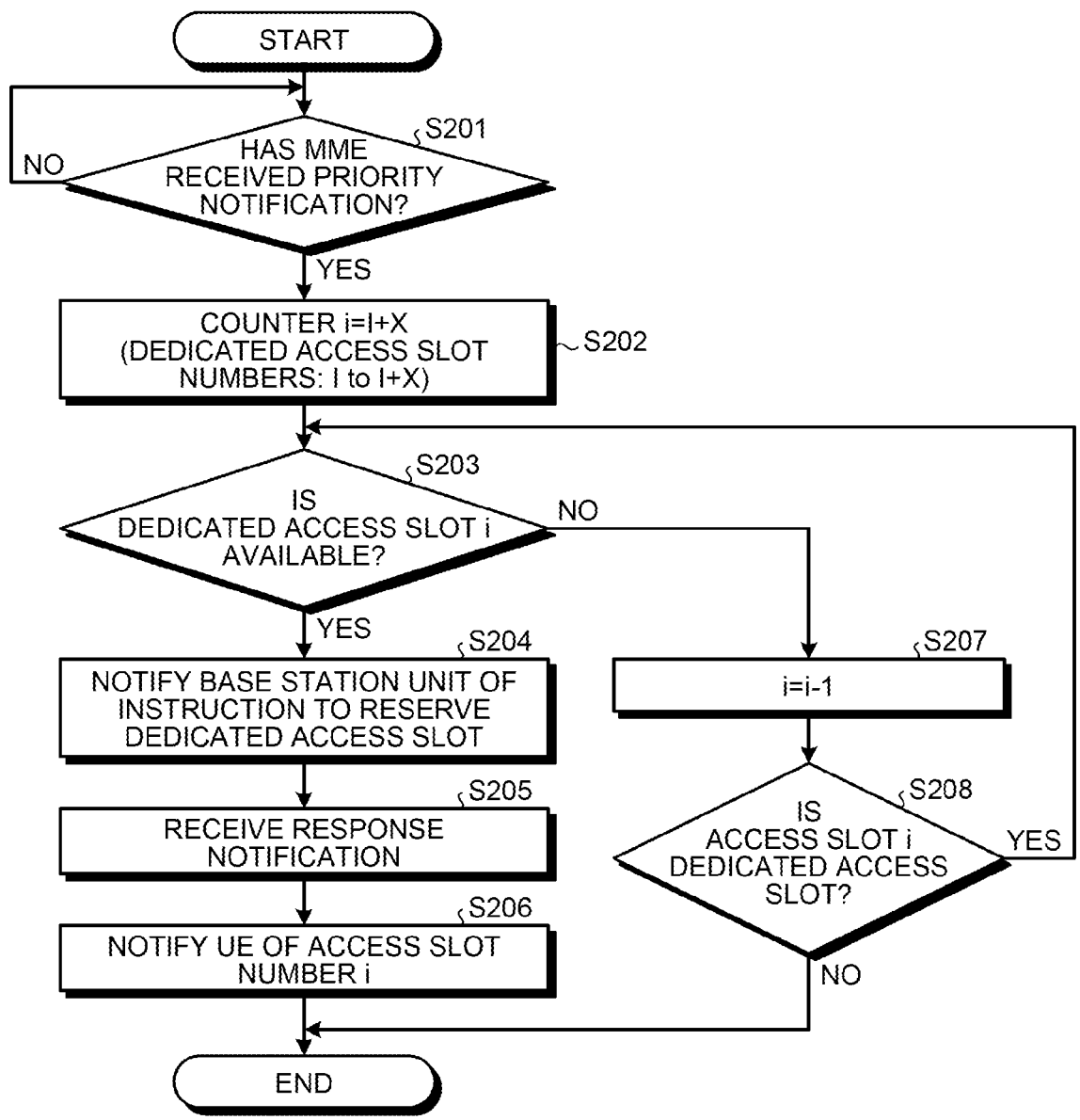
FIG. 11 is a flowchart illustrating a procedure of a dedicated-access-slot selecting process performed by the MME in the second embodiment upon receipt of a priority notification.

Procedure of Selecting Process Performed by MME in Second Embodiment upon Receipt of Priority Notification Subsequently, a procedure of a dedicated-access-slot selecting process performed by the MME 1000 in the second embodiment is explained with reference to FIG. 11. FIG. 11 is a flowchart illustrating the procedure of the dedicated-access-slot selecting process performed by the MME 1000 in the second embodiment upon receipt of a priority notification.

As illustrated in FIG. 11, when the priority/release-notification receiving unit 1200 of the MME 1000 has received a priority notification (YES at Step S201), the selecting unit 1410 sets a counter i to "I+X" (Step S202). Incidentally, here, respective access slot numbers of dedicated access slots are "I" to "I+X". In the case of the example illustrated in FIG. 3, respective access slot numbers of dedicated access slots are "49" to "64", so "I" is "49" and "X" is "15".

Then, the selecting unit 1410 determines whether a dedicated access slot with an access slot number "i" is available (Step S203). When the dedicated access slot is available (YES at Step S203), the selecting unit 1410 selects the dedicated access slot. Then, the instructing unit 1430 transmits a reserve instruction, which is an instruction to reserve the dedicated access slot, to a base station group to which the base station unit 100 that has mediated the priority notification belongs (Step S204).

Then, when the response receiving unit 1440 has received a response notification from the base station group (Step S205), the notifying unit 1450 notifies the UE 10 of the access slot number "i" of the dedicated access slot (Step S206).

On the other hand, when the dedicated access slot with the access slot number "i" is not available (NO at Step S203), the selecting unit 1410 decrements the counter by one (Step S207). Then, the selecting unit 1410 determines whether an access slot indicated by the access slot number "i" is a dedicated access slot (Step S208). In other words, the selecting unit 1410 confirms that an access slot indicated by the access slot number "i" is not an arbitrary access slot.

When an access slot indicated by the access slot number "i" is a dedicated access slot (YES at Step S208), the selecting unit 1410 performs the processes at Steps S203 to S208.

On the other hand, when an access slot indicated by the access slot number "i" is not a dedicated access slot but an arbitrary access slot (NO at Step S208), the selecting unit 1410 ends the process. This is because it is not possible to assign a dedicated access slot to the UE 10.

Figure 12:
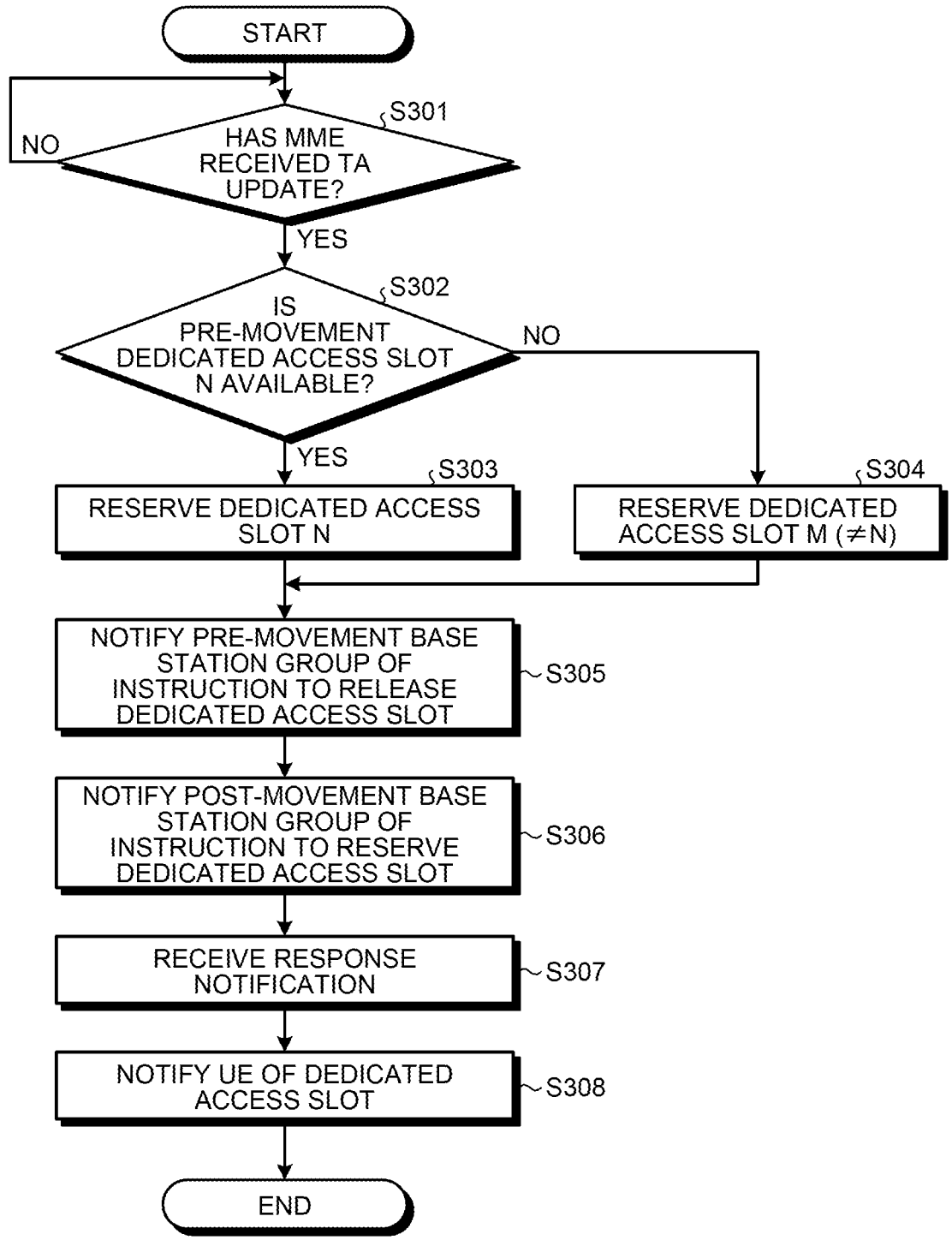
FIG. 12 is a flowchart illustrating a procedure of a dedicated-access-slot selecting process performed by the MME in the second embodiment upon receipt of TA update.

Procedure of Selecting Process Performed by MME in Second Embodiment upon Receipt of TA Update Subsequently, a procedure of a dedicated-access-slot selecting process performed by the MME 1000 in the second embodiment upon receipt of TA update is explained with reference to FIG. 12. FIG. 12 is a flowchart illustrating the procedure of the dedicated-access-slot selecting process performed by the MME 1000 in the second embodiment upon receipt of TA update.

As illustrated in FIG. 12, when the TA-update receiving unit 1300 of the MME 1000 has received TA update (YES at Step S301), the selecting unit 1410 performs the access-slot selecting process. Specifically, the selecting unit 1410 determines whether a dedicated access slot assigned to the UE 10 in a tracking area in which the UE 10 that has transmitted the TA update was located before moving into another tracking area is available in a tracking area into which the UE 10 has moved (Step S302). Namely, the selecting unit 1410 determines whether an access slot number "N" of a dedicated access slot assigned to the UE 10 is an access slot number of a dedicated access slot assigned to another UE in a tracking area into which the UE 10 has moved.

Then, when the access slot number "N" is available (YES at Step S302), the selecting unit 1410 reserves the access slot number "N" (Step S303). On the other hand, when the access slot number is not available (NO at Step S302), the selecting unit 1410 reserves an access slot number "M" different from the access slot number "N" (Step S304). Incidentally, the selecting unit 1410 can reserve the access slot number "M" by performing the processing procedure in FIG. 11.

Then, the releasing unit 1420 releases a dedicated access slot currently assigned to the UE that has transmitted the TA update. Then, the instructing unit 1430 notifies a base station group forming the tracking area in which the UE 10 was located before moving into another tracking area of an instruction to release the dedicated access slot (Step S305). Furthermore, the instructing unit 1430 notifies a base station group forming the tracking area into which the UE 10 has moved of a reserve instruction to reserve the dedicated access slot reserved at Step S303 or S304 (Step S306).

Then, when the response receiving unit 1440 has received a response notification from the base station group (Step S307), the notifying unit 1450 notifies the UE 10 of an access slot number of the dedicated access slot reserved at Step S303 or S304 (Step S308).

As described above, in the wireless communication system N2 according to the second embodiment, the UE 10 transmits a priority notification to the MME 1000 when having been powered on and transmits a release request to the MME 1000 when having powered off. Then, upon receipt of the priority notification, the MME 1000 and the base station unit 100 reserve a dedicated access slot and assign the dedicated access slot to the UE 10. Furthermore, upon receipt of the release request, the MME 1000 and the base station unit 100 release the dedicated access slot assigned to the UE 10. From the above, the wireless communication system N2 according to the second embodiment can prevent a wireless resource from being occupied and also prevent a random access contention.

Incidentally, in the above second embodiment, there is described an example where one dedicated access slot is assigned to one UE 10. However, one dedicated access slot can be assigned to a certain number of UEs. Namely, as long as the probability of occurrence of a random access contention is low, one dedicated access slot can be shared by multiple UEs. Consequently, it is possible to further prevent a dedicated access slot from being occupied by one UE 10.

There is described below a process performed by the MME 1000 when one dedicated access slot is assigned to multiple UEs. FIG. 13 is a diagram illustrating an example of the number of dedicated access slots assigned to multiple UEs. In the example illustrated in FIG. 13, the MME 1000 assigns one dedicated access slot to three UEs. For example, when the number of priority terminals is 1 to 3, the MME 1000 assigns one dedicated access slot to the priority terminals. Furthermore, for example, when the number of priority terminals is 4 to 6, the MME 1000 assigns the first dedicated access slot to three priority terminals, and assigns the second dedicated access slot to the remaining one to three priority terminals.

FIG. 14 is a flowchart illustrating a procedure of a dedicated-access-slot selecting process performed by the MME 1000 when one dedicated access slot is assigned to multiple UEs. Incidentally, hereinafter, the maximum number of UEs which can be assigned to one dedicated access slot may be referred to as an "assignment number threshold".

As illustrated in FIG. 14, when the priority/release-notification receiving unit 1200 of the MME 1000 has received a priority notification (YES at Step S401), the selecting unit 1410 determines whether there is any dedicated access slot which has already been assigned to UE (Step S402). Then, when there is a dedicated access slot which has already been assigned to UE (YES at Step S402), the selecting unit 1410 determines whether the number of UEs assigned to the dedicated access slot is smaller than the assignment number threshold (Step S403).

Then, when the number of the already-assigned UEs is smaller than the assignment number threshold (YES at Step S403), the selecting unit 1410 notifies the UE 10 of an access slot number of the dedicated access slot which has already been assigned to UE (Step S404).

On the other hand, when there is no dedicated access slot which has already been assigned to UE (NO at Step S402) or when the number of the already-assigned UEs is equal to or larger than the assignment number threshold (NO at Step S403), the selecting unit 1410 performs the selecting process illustrated in FIG. 11 (Step S405).

Incidentally, in the example illustrated in FIG. 14, there is described the case where the MME 1000 has received a priority notification; however, also in the case where the MME 1000 has received TA update, the MME 1000 can assign one dedicated access slot to multiple UEs by performing the same process as that is illustrated in FIG. 14.

[c] Third Embodiment

In the above second embodiment, there is described the example where the UE 10 transmits a priority notification or a release request to the MME 1000. However, another device can transmit a priority notification or a release request to the MME. Therefore, in a third embodiment, there will be described an example where a subscriber management device transmits a priority notification or a release request to an MME.

Wireless Communication Processing Performed by Wireless Communication System According to Third Embodiment First, wireless communication processing performed by a wireless communication system N3 according to the third embodiment is explained with reference to FIG. 15. FIG. 15 is a sequence diagram illustrating an example of wireless communication processing performed by the wireless communication system N3 according to the third embodiment. Incidentally, in FIG. 15, as an example, there is described a case where a UE 20 is powered on. Furthermore, in the example illustrated in FIG. 15, the UE 20 is a priority terminal.

In the example illustrated in FIG. 15, an HSS (Home Subscriber Service) 3000 is connected to an MME 2000, and is a subscriber management device that manages information on subscribers, such as the UE 20. The HSS 3000 holds therein, for example, location information of the UE 20 and information indicating whether the UE 20 is a priority terminal.

As illustrated in FIG. 15, when the UE 20 falls into a power-ON state (Step S51), the UE 20 gets an initial attach to the MME 2000 via the base station unit 100a which is a serving base station (Step S52). The initial attach corresponds to, for example, a registering process to register a SIM (Subscriber Identity Module) number or the like on the MME 2000 at the time of start-up of the UE 20.

When having accepted the initial attach from the UE 20, the MME 2000 transmits location update information to the HSS 3000 (Step S53). The HSS 3000 determines whether the UE 20 is a priority terminal or not with reference to subscriber information. Here, the UE 20 is a priority terminal, so the HSS 3000 transmits a priority notification to the MME 2000 (Step S54). The subsequent processes at Steps S55 to S59 are identical to the processes at Steps S14 to S18 illustrated in FIG. 4.

In this manner, the HSS 3000 holds therein information indicating whether the UE 20 is a priority terminal or not; therefore, when the MME 2000 has accepted an initial attach from the UE 20, the HSS 3000 can transmit a priority notification to the MME 2000.

Furthermore, when the MME 2000 has accepted an attach from a UE 20 at the time of power-OFF of the UE 20, the MME 2000 transmits location update information to the HSS 3000. At this time, the HSS 3000 determines whether the UE 20 is a priority terminal or not. Consequently, the HSS 3000 can transmit a release request to the MME 2000 at the time of power-OFF of the UE 20. Moreover, when the MME 2000 has received TA update from a UE 20, the MME 2000 transmits location update information to the HSS 3000. At this time, the HSS 3000 determines whether the UE 20 is a priority terminal or not. Consequently, the HSS 3000 can transmit a priority notification and a release request to the MME 2000 upon receipt of TA update from the UE 20.

Configuration of UE in Third Embodiment

Figure 16:
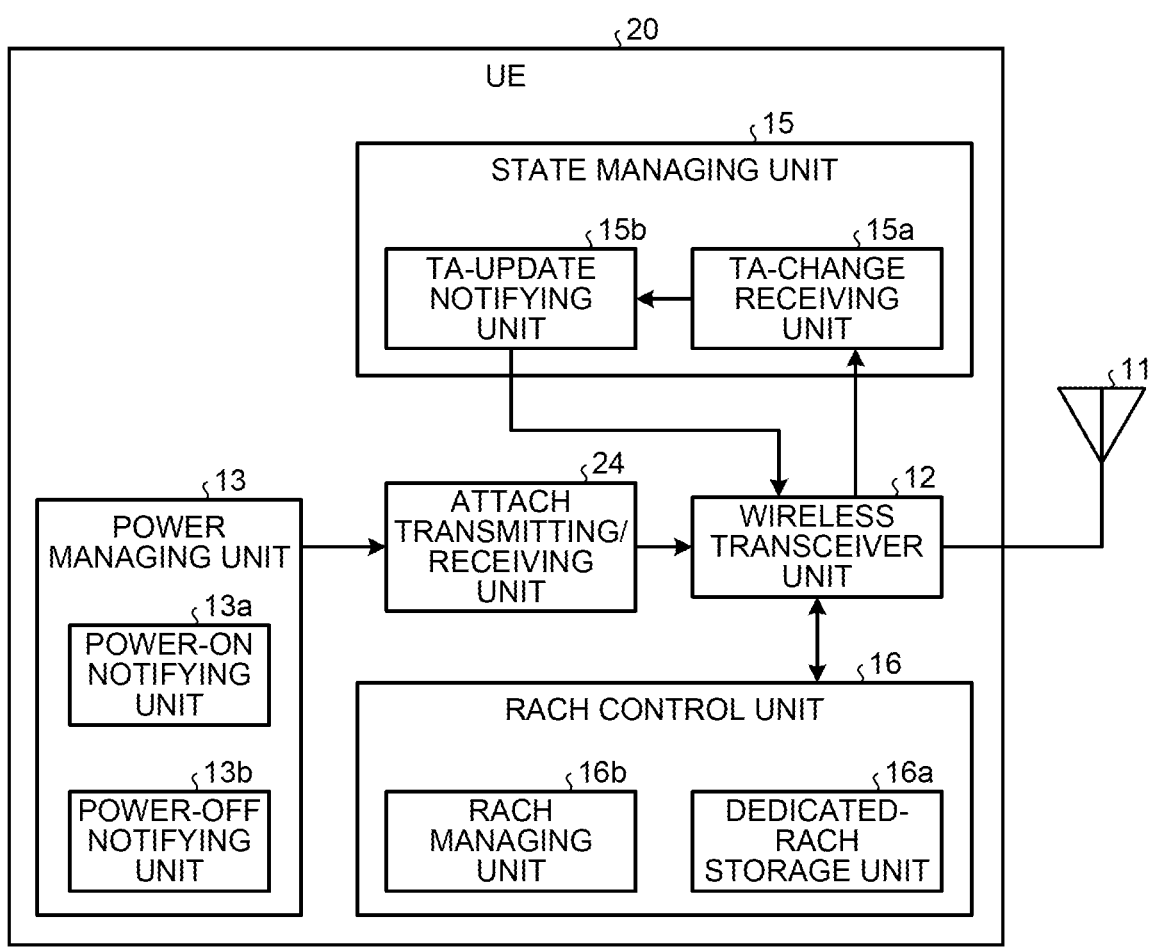
FIG. 16 is a block diagram illustrating a configuration example of a UE in the third embodiment.

Subsequently, a configuration of the UE 20 in the third embodiment is explained with reference to FIG. 16. FIG. 16 is a block diagram illustrating a configuration example of the UE 20 in the third embodiment. Incidentally, hereinafter, a part having the same function as a component part illustrated in FIG. 7 is denoted by the same reference numeral, and detailed description of the part is omitted.

As illustrated in FIG. 16, compared with the UE 10 illustrated in FIG. 7, the UE 20 in the third embodiment includes an attach transmitting/receiving unit 24 instead of the priority/release notifying unit 14. The attach transmitting/receiving unit 24 performs attach processing. For example, when having notified of information indicating power-ON by the power-ON notifying unit 13a, the attach transmitting/receiving unit 24 gets an initial attach as in the example illustrated at Step S52 in FIG. 15. Furthermore, for example, when having notified of information indicating power-OFF by the power-OFF notifying unit 13b, the attach transmitting/receiving unit 24 performs attach processing to get an attach to the base station unit 100.

Configuration of MME in Third Embodiment

Figure 17:
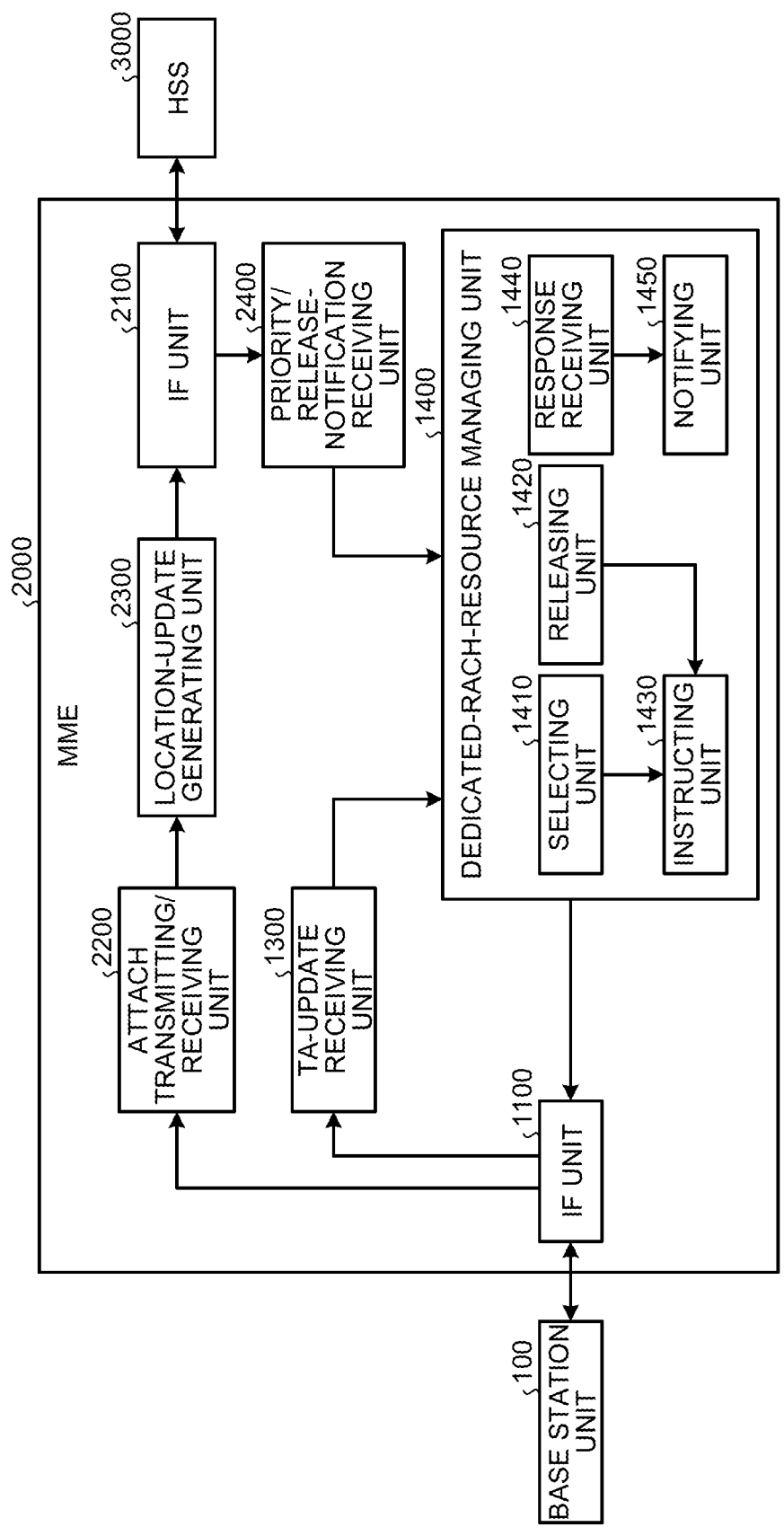
FIG. 17 is a block diagram illustrating a configuration example of an MME in the third embodiment.

Subsequently, a configuration of the MME 2000 in the third embodiment is explained with reference to FIG. 17. FIG. 17 is a block diagram illustrating a configuration example of the MME 2000 in the third embodiment. Incidentally, hereinafter, a part having the same function as a component part illustrated in FIG. 9 is denoted by the same reference numeral, and detailed description of the part is omitted.

As illustrated in FIG. 17, compared with the MME 1000 illustrated in FIG. 9, the MME 2000 in the third embodiment includes an IF unit 2100, an attach transmitting/receiving unit 2200, a location-update generating unit 2300, and a priority/release-notification receiving unit 2400 instead of the priority/release-notification receiving unit 1200.

The IF unit 2100 transmits and receives various signals with the HSS 3000. The attach transmitting/receiving unit 2200 receives various signals transmitted from a UE 20 when the attach transmitting/receiving unit 24 of the UE 20 has performed attach processing.

The location-update generating unit 2300 transmits location update information to the HSS 3000 via the IF unit 2100 when the attach transmitting/receiving unit 2200 has received a signal transmitted from the attach transmitting/receiving unit 24 of the UE 20. The priority/release-notification receiving unit 2400 receives a priority notification and release request transmitted from the HSS 3000. Then, the priority/release-notification receiving unit 2400 notifies the dedicated-RACH-resource managing unit 1400 of the priority notification and release request received from the HSS 3000.

Configuration of HSS in Third Embodiment

Figure 18:
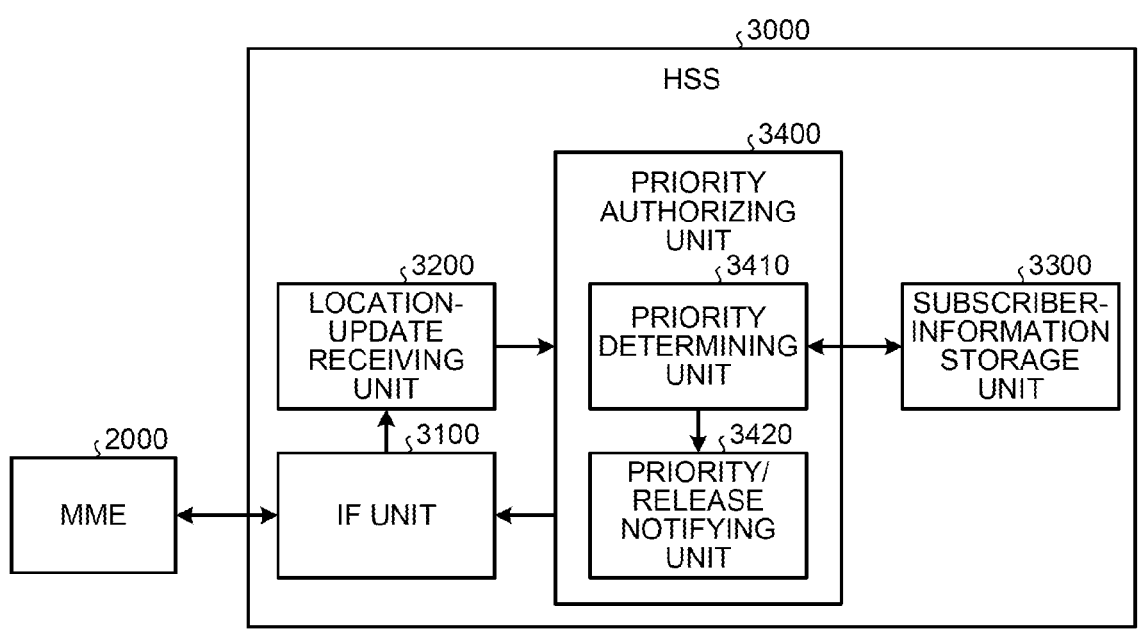
FIG. 18 is a block diagram illustrating a configuration example of an HSS in the third embodiment.

Subsequently, a configuration of the HSS 3000 in the third embodiment is explained with reference to FIG. 18. FIG. 18 is a block diagram illustrating a configuration example of the HSS 3000 in the third embodiment. As illustrated in FIG. 18, the HSS 3000 in the third embodiment includes an IF unit 3100, a location-update receiving unit 3200, a subscriber-information storage unit 3300, and a priority authorizing unit 3400.

The IF unit 3100 transmits and receives various signals with the MME 2000. The location-update receiving unit 3200 receives location update information transmitted from the location-update generating unit 2300 of the MME 2000. The location-update receiving unit 3200 notifies the priority authorizing unit 3400 of the location update information received from the MME 2000.

The subscriber-information storage unit 3300 stores therein various information on subscribers, such as UEs 20. For example, the subscriber-information storage unit 3300 stores therein terminal identification information for identifying a UE 20, priority terminal information indicating whether the UE 20 is a priority terminal or not, and the like.

The priority authorizing unit 3400 includes a priority determining unit 3410 and a priority/release notifying unit 3420. The priority determining unit 3410 determines whether a UE 20 is a priority terminal or not on the basis of subscriber information stored in the subscriber-information storage unit 3300. Specifically, the priority determining unit 3410 acquires priority terminal information corresponding to terminal identification information of a UE 20 that has performed attach processing from the subscriber-information storage unit 3300, thereby determining whether the UE 20 is a priority terminal or not.

The priority/release notifying unit 3420 transmits a priority notification or a release request to the MME 2000 when the priority determining unit 3410 has determined that a UE 20 is a priority terminal. Incidentally, when the priority determining unit 3410 has determined that a UE 20 is a priority terminal, the priority/release notifying unit 3420 can just notify that the UE 20 is a priority terminal without transmitting a priority notification or a release request to the MME 2000. In this case, when having been notified that the UE 20 is a priority terminal by the HSS 3000, the MME 2000 issues a reserve instruction or a release instruction to the base station unit 100.

As described above, in the wireless communication system N3 according to the third embodiment, the HSS 3000 transmits a priority notification or a release request to the MME 2000 upon receipt of location update information from the MME 2000. Namely, when a UE 20 is powered on, the HSS 3000 can transmit a priority notification to the MME 2000; when the UE 20 is powered off, the HSS 3000 can transmit a release request to the MME 2000. Consequently, the wireless communication system N3 according to the third embodiment can prevent a wireless resource from being occupied and also prevent a random access contention.

[d] Fourth Embodiment

Besides the above-described embodiments, the wireless communication system, management device, mobile terminal unit, wireless communication method, and wireless communication program disclosed in the present application can be implemented by various different embodiments. In a fourth embodiment, there are described other embodiments of the wireless communication system, management device, mobile terminal unit, wireless communication method, and wireless communication program disclosed in the present application.

Trigger to Release Dedicated Access Slot

In the above second and third embodiments, there is described an example where when a UE is powered off, a dedicated access slot assigned to the UE is released. However, in the wireless communication system, etc. disclosed in the present application, when a UE does not perform wireless communication with a base station unit for more than a predetermined period of time, a dedicated access slot assigned to the UE can be released.

Configuration of Wireless Communication System

In the above second and third embodiments, there is provided an example where when a UE moves between the tracking areas formed by the base station units 100a to 100f managed by one MME 1000 as in the example illustrated in FIG. 6, a dedicated access slot assigned to the UE is updated. However, in the wireless communication system, etc. disclosed in the present application, this can also be applied to a case where a UE moves from a tracking area formed by a base station unit 100A managed by an MME 1000A into a tracking area formed by a base station unit 100B managed by an MME 1000B. In this case, the MME 1000A transmits a release request to a base station group to which the base station unit 100A belongs, and the MME 1000B transmits a priority notification to a base station group to which the base station unit 100B belongs.

Program

The various processes described in the above embodiments can be realized by causing a computer, such as a personal computer or a workstation, to execute a program prepared in advance. An example of the computer that executes a wireless communication program having the same function as the management device 2 illustrated in FIG. 1 is explained below with reference to FIG. 19.

Figure 19:
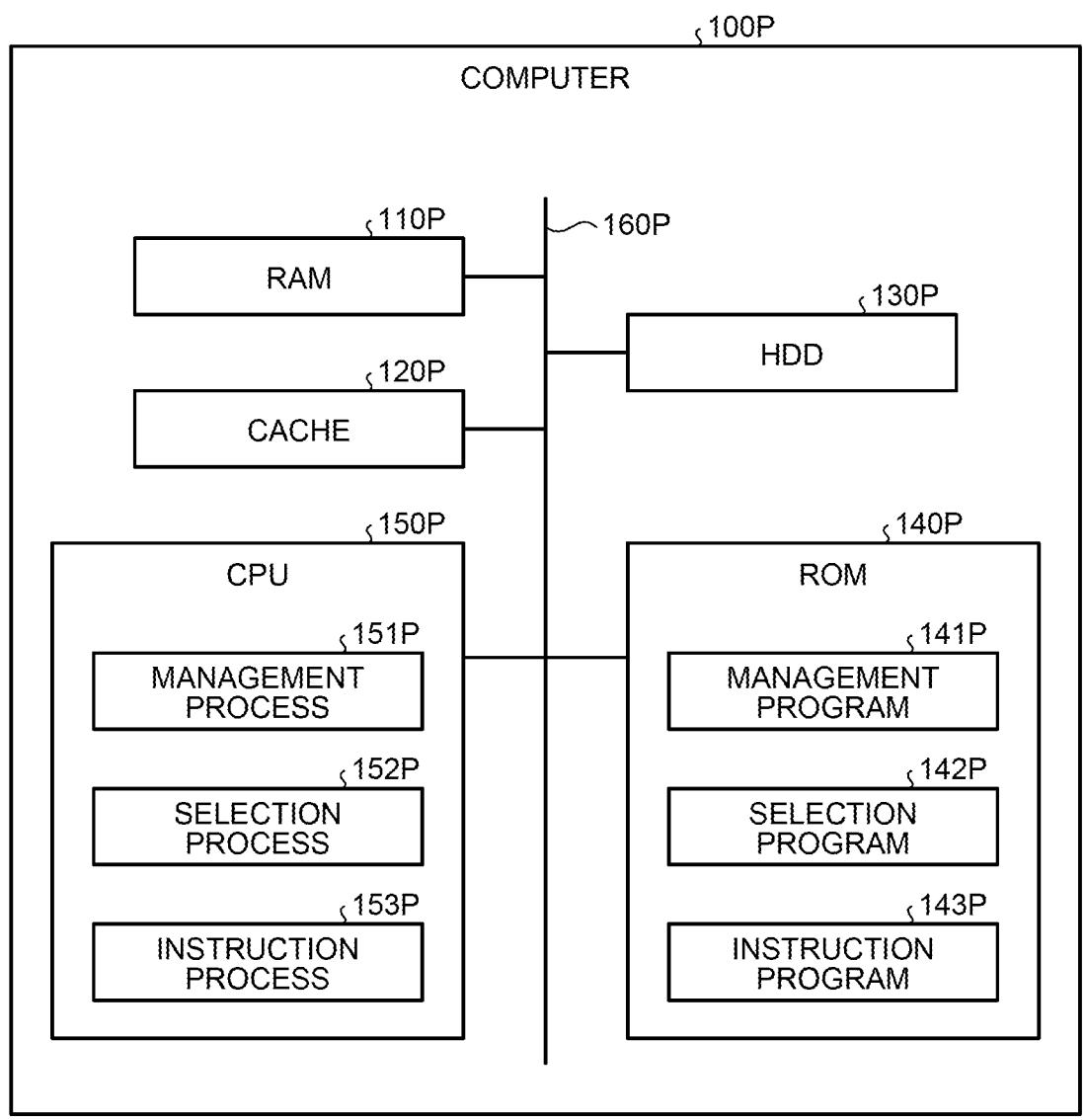
FIG. 19 is a diagram illustrating a computer that executes a wireless communication program.

FIG. 19 is a diagram illustrating a computer that executes the wireless communication program. As illustrated in FIG. 19, a computer 100P includes a random access memory (RAM) 110P, a cache 120P, an HDD 130P, a read-only memory (ROM) 140P, a central processing unit (CPU) 150P, and a bus 160P. The RAM 110P, the cache 120P, the HDD 130P, the ROM 140P, and the CPU 150P are connected to one another by the bus 160P.

The wireless communication program fulfilling the same function as the management device 2 illustrated in FIG. 1 has been stored in the ROM 140P in advance. Specifically, a management program 141P, a selection program 142P, and an instruction program 143P have been stored in the ROM 140P. The CPU 150P reads out the management program 141P, the selection program 142P, and the instruction program 143P from the ROM 140P and executes the read programs.

As a result, as illustrated in FIG. 19, the management program 141P becomes a management process 151P; the selection program 142P becomes a selection process 152P; the instruction program 143P becomes an instruction process 153P. Incidentally, the management process 151P corresponds to the managing unit 2a illustrated in FIG. 1; the selection process 152P corresponds to the selecting unit 2b illustrated in FIG. 1; the instruction process 153P corresponds to the instructing unit 2c illustrated in FIG. 1.

Incidentally, the above-described programs 141P to 143P do not always have to be stored in the ROM 140P. For example, these programs 141P to 143P can be stored in a "portable physical medium", such as a flexible disk (FD), a CD-ROM, an MO disk, a DVD, a magnet-optical disk, or an IC card, inserted into the computer 100P. Or, these programs 141P to 143P can be stored in a "fixed physical medium", such as an HDD installed on the inside or outside of the computer 100P. Furthermore, these programs 141P to 143P can be stored on "another computer (or a server)" connected to the computer 100P via a public line, the Internet, a LAN, or a WAN, etc. Then, the computer 100P can be configured to read out the programs from the above-described flexible disk or the like and execute the read programs.

System Configuration, etc.

Components of each apparatus illustrated in the drawings are functionally conceptual ones, and do not always have to be physically configured as illustrated in the drawings. Namely, specific forms of division and integration of components of each apparatus are not limited to those illustrated in the drawings, and all or some of the components can be configured to be functionally or physically divided or integrated in arbitrary units depending on various loads and use conditions, etc. For example, the TA-change receiving unit 15a and the TA-update notifying unit 15b illustrated in FIG. 7 can be integrated into one unit, and the priority/release-notification receiving unit 1200 illustrated in FIG. 9 can be divided into a priority-notification receiving unit and a release-request receiving unit.

According to one aspect of a wireless communication system disclosed in the present application, it is possible to prevent a wireless resource from being constantly occupied and also prevent a random access contention.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication system comprising:
   a base station unit that performs wireless communication with a mobile terminal unit; and
   a management device that manages the base station unit, wherein
   the management device includes:
      a managing unit that manages whether a dedicated access slot is assigned to the mobile terminal unit, the dedicated access slot being different from an access slot which is arbitrarily used by the mobile terminal unit when the mobile terminal unit gets random access to the base station unit;
      a selecting unit that selects a dedicated access slot which has not been assigned among dedicated access slots managed by the managing unit when having received a priority notification indicating that a mobile terminal unit being a communicating destination of the base station unit is a priority terminal given priority for performing communication; and
      an instructing unit that instructs the base station unit managed by the management device to reserve the dedicated access slot selected by the selecting unit,
   the base station unit includes:
      an assigning unit that assigns the dedicated access slot instructed by the instructing unit to the priority terminal, and
   the mobile terminal unit includes:
      a storage unit that stores therein information indicating the dedicated access slot assigned by the assigning unit; and a communication unit that gets random access to the base station unit through the dedicated access slot indicated by the information stored in the storage unit.

2. The wireless communication system according to claim 1, wherein the management device further includes a releasing unit that releases a dedicated access slot indicated by a release request among the dedicated access slots managed by the managing unit when having received the release request to release the dedicated access slot assigned to the priority terminal, and the instructing unit instructs the base station unit managed by the management device to release the dedicated access slot released by the releasing unit.

3. The wireless communication system according to claim 2, wherein the mobile terminal unit further includes a transmitting unit that transmits the priority notification to the management device via the base station unit when the mobile terminal unit is powered on, and transmits the release request to the management device via the base station unit when the mobile terminal unit is powered off.

4. The wireless communication system according to claim 2, wherein the selecting unit selects a dedicated access slot which has not been assigned among the dedicated access slots managed by the managing unit when having received the priority notification from a subscriber management device that manages information on subscribers of mobile terminal units, and the releasing unit releases a dedicated access slot indicated by the release request among the dedicated access slots managed by the managing unit when having received the release request from the subscriber management device.

5. The wireless communication system according to claim 2, wherein when a dedicated access slot is selected by the selecting unit, the instructing unit instructs a base station group to which a base station unit being a communicating destination of the priority terminal belongs among base station groups of multiple base station units sharing a common access slot to reserve the dedicated access slot, and when a dedicated access slot is released by the releasing unit, the instructing unit instructs a base station group to which a base station unit being a communicating destination of the priority terminal belongs to release the dedicated access slot.

6. A management device comprising:

a managing unit that manages whether a dedicated access slot is assigned to the mobile terminal unit, the dedicated access slot being different from an access slot which is arbitrarily used by a mobile terminal unit when the mobile terminal unit gets random access to a base station unit;

a selecting unit that selects a dedicated access slot which has not been assigned among dedicated access slots managed by the managing unit when having received a priority notification indicating that a mobile terminal unit being a communicating destination of the base station unit is a priority terminal given priority for performing communication; and an instructing unit that instructs the base station unit managed by the management device to reserve the dedicated access slot selected by the selecting unit.

7. The management device according to claim 6, further comprising a releasing unit that releases a dedicated access slot indicated by a release request among the dedicated access slots managed by the managing unit when having received the release request to release the dedicated access slot assigned to the priority terminal, wherein the instructing unit instructs the base station unit managed by the management device to release the dedicated access slot released by the releasing unit.

8. The management device according to claim 6, wherein the managing unit manages the number of mobile terminal units to which a dedicated access slot shared by a certain number of mobile terminal units is assigned, and the selecting unit selects a dedicated access slot which has not been assigned to the certain number of mobile terminal units among the dedicated access slots managed by the managing unit when having received the priority notification.

9. The management device according to claim 7, wherein the managing unit manages whether a dedicated access slot has been assigned to a mobile terminal unit with respect to each base station group of multiple base station units sharing a common access slot, the selecting unit selects a dedicated access slot corresponding to a second base station group which has not been assigned among the dedicated access slots managed by the managing unit when having received a change notification that a communicating destination of the priority terminal is changed from a first base station group to the second base station group, the releasing unit releases a dedicated access slot assigned to the priority terminal in the first base station group among dedicated access slots corresponding to the first base station group when having received the change notification, and the instructing unit instructs the first base station group to release the dedicated access slot assigned to the priority terminal in the first base station group, and instructs the second base station group to reserve the dedicated access slot selected by the selecting unit.

10. A mobile terminal unit comprising:

a transmitting unit that transmits a priority notification that the mobile terminal unit is a priority terminal given priority for performing communication to a base station unit when the mobile terminal unit is powered on;

a storage unit that stores therein an access slot number of an access slot used in random access when the access slot number has been transmitted from the base station unit that has responded to the priority notification transmitted by the transmitting unit; and a communication unit that gets random access to the base station unit through the access slot indicated by the access slot number stored in the storage unit.

* * * * *